US009678362B2

(12) United States Patent
Iigahama et al.

(10) Patent No.: US 9,678,362 B2
(45) Date of Patent: Jun. 13, 2017

(54) OPTICAL DEVICE PROVIDED TO AN EYE GLASS OR A HELMET HAVING A VOLTAGE CONTROL UNIT THAT SWITCHES A VOLTAGE CYCLICALLY

(71) Applicant: ColorLink Japan, Ltd., Niigata (JP)

(72) Inventors: Yukio Iigahama, Tokyo (JP); Yuta Dogen, Tokyo (JP); Masayuki Sasagawa, Tokyo (JP)

(73) Assignee: ColorLink Japan, Ltd., Niigata (JP)

( * ) Notice: Subject to any disclaimer, the term of this patent is extended or adjusted under 35 U.S.C. 154(b) by 0 days.

(21) Appl. No.: 14/727,882

(22) Filed: Jun. 2, 2015

(65) Prior Publication Data

US 2015/0346517 A1    Dec. 3, 2015

Related U.S. Application Data

(63) Continuation of application No. PCT/JP2012/007747, filed on Dec. 3, 2012.

(51) Int. Cl.
*G02C 7/10*   (2006.01)
*G02C 7/12*   (2006.01)
*G02F 1/133*  (2006.01)

(52) U.S. Cl.
CPC ............. *G02C 7/101* (2013.01); *G02C 7/105* (2013.01); *G02C 7/12* (2013.01); *G02F 1/13318* (2013.01)

(58) Field of Classification Search
CPC .......... G02C 7/101; G02C 7/105; G02C 7/12; G02F 1/13318
See application file for complete search history.

(56) References Cited

U.S. PATENT DOCUMENTS 4,279,474 A   7/1981  Belgorod
5,276,539 A   1/1994  Humphrey
(Continued)

FOREIGN PATENT DOCUMENTS

JP   S48-098846 A   12/1973
JP   H9-005705 A    1/1997
(Continued)

OTHER PUBLICATIONS

Extended European Search Report for European Patent Application No. 12889565.3, issued by the European Patent Office on Jul. 7, 2016.

(Continued)

*Primary Examiner* — Paul Lee

(57) ABSTRACT

An optical device comprises: a transmittance changing unit that is provided in front of an eye of a user, and changes transmittance for light from the outside according to a voltage being applied; and a voltage control unit that controls a voltage to be applied to the transmittance changing unit by switching cyclically between a high voltage and a low voltage, wherein the voltage control unit switches the voltage at a cycle that is shorter than the sum of time required for transmittance of the transmittance changing unit to stabilize when changing from a minimum value to a maximum value by switching a voltage and time required for transmittance of the transmittance changing unit to stabilize when changing from a maximum value to a minimum value by switching a voltage.

18 Claims, 27 Drawing Sheets

(56) References Cited

U.S. PATENT DOCUMENTS

| | | | |
|---|---|---|---|
| 7,753,520 B2 * | 7/2010 | Fuziak, Jr. | G02B 27/0172 345/7 |
| 2001/0038491 A1 * | 11/2001 | Fergason | G02B 27/2228 359/466 |
| 2001/0050754 A1 | 12/2001 | Hay et al. | |
| 2009/0066863 A1 * | 3/2009 | Chen | G02F 1/13363 349/13 |
| 2009/0213282 A1 | 8/2009 | Burlingame et al. | |
| 2010/0157178 A1 * | 6/2010 | MacNaughton | H04N 13/0438 349/15 |

FOREIGN PATENT DOCUMENTS

| | | |
|---|---|---|
| JP | 2001-022326 A | 1/2001 |
| JP | 2002-122845 A | 4/2002 |
| JP | 2007-148417 A | 6/2007 |
| JP | 2007148417 A * | 6/2007 |
| JP | 2008-165434 A | 7/2008 |
| JP | 2009-265216 A | 11/2009 |
| JP | 2010-048907 A | 3/2010 |
| JP | 2011-257470 A | 12/2011 |

OTHER PUBLICATIONS

International Search Report for International Application No. PCT/JP2012/007747, issued by the Japan Patent Office on Jan. 8, 2013.
International Preliminary Report on Patentability for International Application No. PCT/JP2012/007747, issued by the International Bureau of WIPO on Jun. 18, 2015.
Office Action issued for counterpart Canadian Application 2,901,732, issued by the Canadian Intellectual Property Office on Oct. 26, 2016.
Office Action issued for counterpart Japanese Application 2013-512914, issued by Japanese Patent Office on May 21, 2013.
Office Action issued for counterpart Australian Application 2012395867, issued by the Australian Patent Office on Jan. 25, 2017.
Notice of First Office Action for Patent Application No. 201280078184.2, issued by The State Intellectual Property Office of People's Republic of China on Mar. 22, 2017.

* cited by examiner

| DutyNo | HIGH VOLTAGE PERIOD [ms] | LOW VOLTAGE PERIOD [ms] | HIGH VOLTAGE DUTY RATIO | CUMULATIVE TRANSMITTANCE [%] |
|---|---|---|---|---|
| 1 | 2.0 | 0.2 | 0.91 | 4.4 |
| 2 | 1.9 | 0.3 | 0.86 | 5.1 |
| 3 | 1.8 | 0.4 | 0.82 | 6.0 |
| 4 | 1.7 | 0.5 | 0.77 | 7.1 |
| 5 | 1.6 | 0.6 | 0.73 | 8.4 |
| 6 | 1.5 | 0.7 | 0.68 | 9.9 |
| 7 | 1.4 | 0.8 | 0.64 | 11.8 |
| 8 | 1.3 | 0.9 | 0.59 | 13.8 |
| 9 | 1.2 | 1.0 | 0.55 | 16.2 |
| 10 | 1.1 | 1.1 | 0.50 | 19.5 |
| 11 | 1.0 | 1.2 | 0.46 | 22.5 |
| 12 | 0.9 | 1.3 | 0.41 | 25.9 |
| 13 | 0.8 | 1.4 | 0.36 | 29.3 |
| 14 | 0.7 | 1.5 | 0.32 | 32.4 |
| 15 | 0.6 | 1.6 | 0.27 | 34.7 |
| 16 | 0.5 | 1.7 | 0.23 | 36.2 |
| 17 | 0.4 | 1.8 | 0.18 | 36.7 |
| 18 | 0.3 | 1.9 | 0.14 | 37.0 |
| 19 | 0.2 | 2.0 | 0.09 | 37.1 |

| LIGHT AMOUNT | VOLTAGE |
|---|---|
| LA<Th0 | 0 |
| Th0≦LA<Th1 | VL5 |
| Th1≦LA<Th2 | VL4 |
| Th2≦LA<Th3 | VL3 |
| Th3≦LA<Th4 | VL2 |
| Th4≦LA | VL1 |

166

| LIGHT AMOUNT | VOLTAGE | | |
|---|---|---|---|
| | DIVIDED ELECTRODE 164 | DIVIDED ELECTRODE 162 | DIVIDED ELECTRODE 160 |
| LA<Th0 | 0 | 0 | 0 |
| Th0≦LA<Th1 | VL5 | VL4 | VL4 |
| Th1≦LA<Th2 | VL4 | VL4 | VL3 |
| Th2≦LA<Th3 | VL4 | VL3 | VL2 |
| Th3≦LA<Th4 | VL4 | VL3 | VL1 |

| 80 | |
|---|---|
| AVERAGED LIGHT AMOUNT | TARGET TRANSMITTANCE |
| AL1 | TTr1 |
| AL2 | TTr2 |
| AL3 | TTr3 |
| AL4 | TTr4 |
| AL5 | TTr5 |

OPTICAL DEVICE PROVIDED TO AN EYE GLASS OR A HELMET HAVING A VOLTAGE CONTROL UNIT THAT SWITCHES A VOLTAGE CYCLICALLY

The contents of the following PCT application is incorporated herein by reference: PCT/JP2012/007747 filed on Dec. 3, 2012

BACKGROUND

1. Technical Field

The present invention relates to an optical device.

2. Related Art

An optical device such as eye glasses that can change transmittance by applying a voltage to liquid crystal or the like is known (see Patent Literature 1, for example).
[Patent Literature 1] Japanese Patent Application Publication No. S48-98846

Here, in some cases, an optical device is controlled by cyclically changing a voltage to be applied to liquid crystal or the like. However, flicker occurs if the cycle of the voltage and the blinking cycle of external light such as a signal are similar to each other.

SUMMARY

A first aspect of the present invention provides an optical device comprising: a transmittance changing unit that is provided in front of an eye of a user, and changes transmittance for light from the outside according to a voltage being applied; and a voltage control unit that controls a voltage to be applied to the transmittance changing unit by switching cyclically between a high voltage and a low voltage, wherein the voltage control unit switches the voltage at a cycle that is shorter than the sum of time required for transmittance of the transmittance changing unit to stabilize when changing from a minimum value to a maximum value by switching a voltage and time required for transmittance of the transmittance changing unit to stabilize when changing from a maximum value to a minimum value by switching a voltage.

The summary clause does not necessarily describe all necessary features of the embodiments of the present invention. The present invention may also be a sub-combination of the features described above.

BRIEF DESCRIPTION OF THE DRAWINGS

FIG. 21 shows numerical data of FIG. 20.

FIG. 22 is a diagram illustrating a case where the cycle of an external light source and the cycle of a voltage applied to the transmittance changing unit 16 are similar.

FIG. 23 is a diagram illustrating a case where duty-control is performed on the voltage when the cycle of an external light source and the cycle of a voltage applied to the transmittance changing unit 16 are similar.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
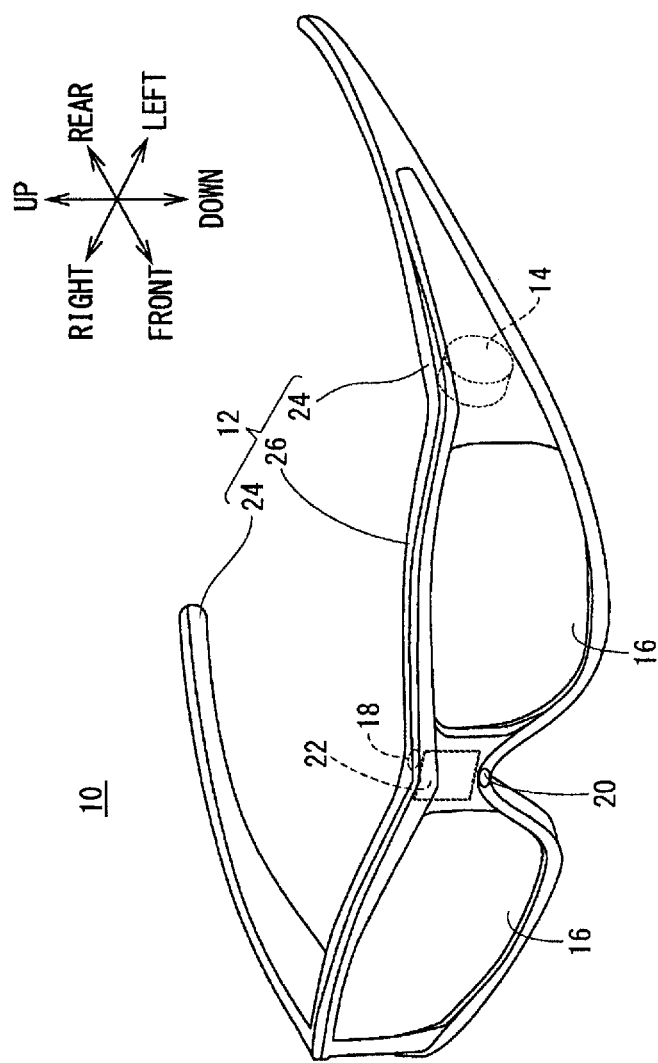
FIG. 1 is an overall configuration diagram of an optical device 10.

FIG. 1 is an overall configuration diagram of an optical device 10. As shown in FIG. 1, one example of the optical device 10 is eye glasses. As indicated with arrows in FIG. 1, the up, down, left, right, front and rear directions as seen from a user who has worn the optical device 10 are defined as the up, down, left, right, front and rear directions of the optical device 10.

The optical device 10 comprises a frame body 12, a power source unit 14, a pair of transmittance changing units 16, 16, a proximity sensor 18, a frontal light-amount detection unit 20, and a control unit 22.

The frame body 12 holds the power source unit 14, the pair of transmittance changing units 16, the proximity sensor 18, the frontal light-amount detection unit 20, and the control unit 22. The frame body 12 has a pair of left and right arm parts 24, 24 and a frame main body part 26. Front end portions of the pair of arm parts 24 are coupled to left and right end portions of the frame main body part 26, respectively. Rear end portions of the arm parts 24 are worn on the ears of the user. Thereby, the frame main body part 26 is placed in front of the eyes of the user together with the pair of transmittance changing units 16. The frame main body part 26 supports the pair of transmittance changing units 16.

The power source unit 14 is controlled by the control unit 22 to apply a voltage to the pair of transmittance changing units 16, the proximity sensor 18, the frontal light-amount detection unit 20, and the control unit 22. One example of the power source unit 14 is a chargeable secondary battery. Examples of the secondary battery are a lithium battery and a nickel battery. Note that the power source unit 14 may be a primary battery.

The pair of transmittance changing units 16 is held by the frame main body part 26 and is provided in front of the left and right eyes of the user. The pair of transmittance changing units 16, 16 changes the transmittance for light entering from the outside according to a voltage that is applied after being output from the power source unit 14 and adjusted by the control unit 22.

The proximity sensor 18 is placed on the rear surface, that is, on the user side, of a central portion of the frame main body part 26. The proximity sensor 18 is mounted on the control unit 22 and connected to the control unit 22. The proximity sensor 18 detects presence or absence of an object behind the frame main body part 26 and outputs information about the presence or absence. Accordingly, when the optical device 10 is worn by a user, the proximity sensor 18 detects that a user is present behind the frame main body part 26 and outputs a presence signal that is one example of information about the presence or absence to the control unit 22. One example of the proximity sensor 18 is a light-emitting element that outputs light such as infrared backward, and a light receiving element that receives the light such as infrared output from the light-emitting element and converts the light into an electrical signal. Accordingly, the light output from the light-emitting element is reflected on a user who has worn the optical device 10 or the like, and is received by the light receiving element. In this case, the proximity sensor 18 detects the presence of a user and outputs a presence signal.

The frontal light-amount detection unit 20 is placed on the front surface, that is, the entrance side, of a central portion of the frame main body part 26.

The frontal light-amount detection unit 20 is mounted on the control unit 22 and connected to the control unit 22. The frontal light-amount detection unit 20 is provided to face forward. Note that "front" means not only the directly frontal direction with inclination in the horizontal direction and vertical direction of 0°, but also directions that are inclined toward the horizontal direction and vertical direction. One example of the frontal light-amount detection unit 20 is a photodiode. The frontal light-amount detection unit 20 detects an amount of light from the outside entering from a frontal direction, converts the detected light amount into an electrical signal and outputs the electrical signal. The electrical signal is one example of information about a light amount. One example of the light amount is illuminance [unit: lux (=lx)].

The control unit 22 is provided to a central portion of the frame main body part 26. The control unit 22 is connected to the transmittance changing unit 16 by flexible wiring. Note that the control unit 22 may be connected by flexible wiring without the proximity sensor 18 and the frontal light-amount detection unit 20 being mounted thereon. The control unit 22 performs overall control of the optical device 10. Details of the control unit 22 are described below.

Figure 2:
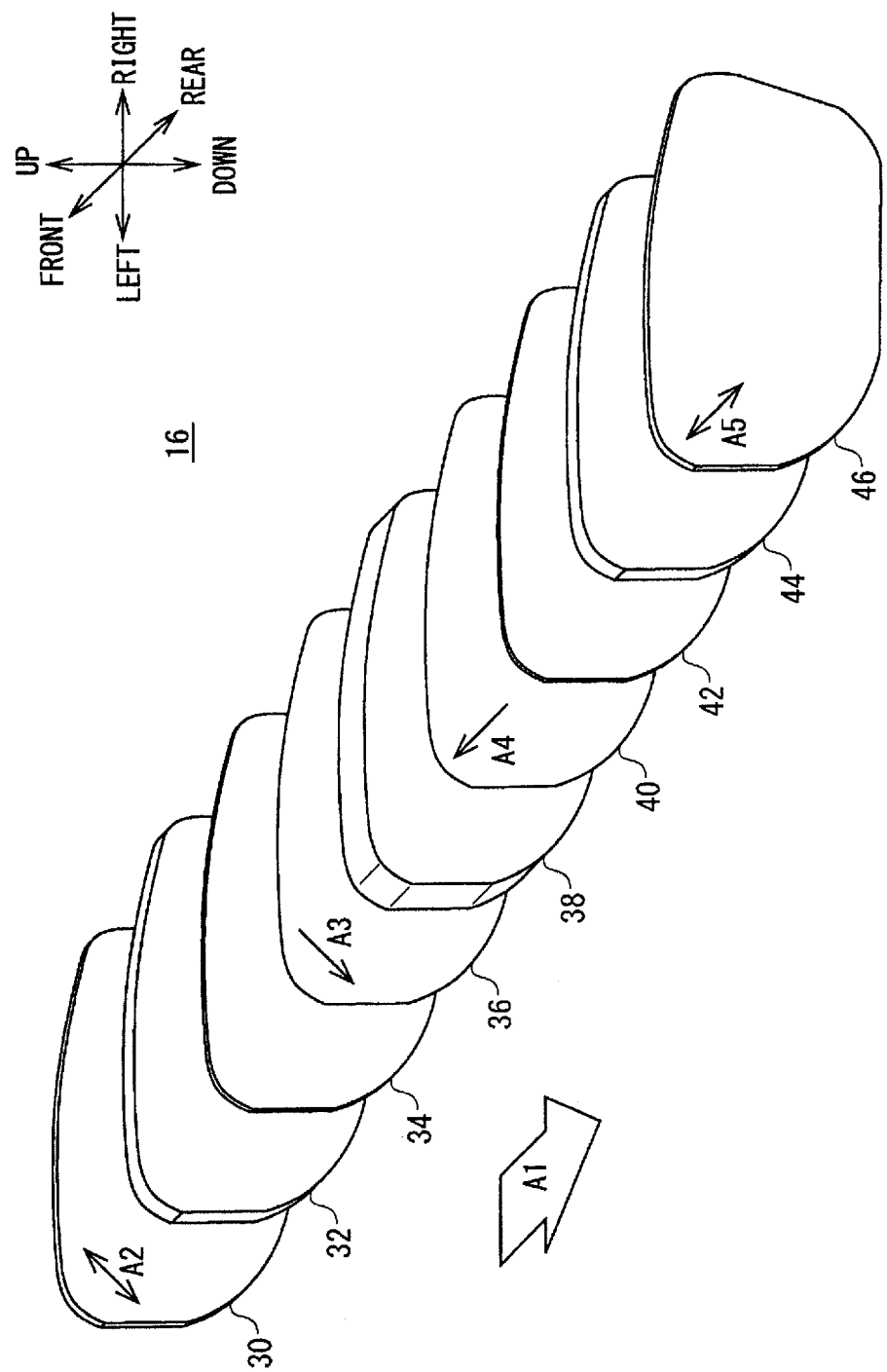
FIG. 2 is an exploded perspective view of a transmittance changing unit 16.

FIG. 2 is an exploded perspective view of the transmittance changing unit 16. The frontal direction of the optical device 10, when it is worn by a user, is a direction toward the outside. Accordingly, as indicated with an arrow A1, light from the outside advances from a frontal direction or a direction inclined from the frontal direction in the vertical direction toward a rear direction. Also, the user who has worn the optical device 10 is positioned behind the transmittance changing unit 16.

As shown in FIG. 2, the transmittance changing unit 16 has an entrance-side polarizing plate 30, an entrance-side substrate 32, an entrance-side transparent electrode 34, an entrance-side orientation film 36, a liquid crystal member 38, an exit-side orientation film 40, an exit-side transparent electrode 42, an exit-side substrate 44, and an exit-side polarizing plate 46. The entrance-side transparent electrode 34, the entrance-side orientation film 36, the liquid crystal member 38, the exit-side orientation film 40, and the exit-side transparent electrode 42 are one example of a polarization modulation unit.

The entrance-side polarizing plate 30 is placed farthest on the entrance side of the transmittance changing unit 16. The entrance-side polarizing plate 30 covers the entire exit-side surface of the entrance-side substrate 32. As indicated with an arrow A2, the entrance-side polarizing plate 30 has a transmission axis inclined counterclockwise from the horizontal direction as seen from the exit side. One example of the inclination angle of the transmission axis of the entrance-side polarizing plate 30 is 45° clockwise from the vertical direction as seen from the exit side. The entrance-side polarizing plate 30 polarizes light entering from the outside, for example, non-polarized natural light into linearly polarized light whose polarization direction is parallel with the transmission axis, and outputs the light.

The entrance-side substrate 32 is placed on the exit side of the entrance-side polarizing plate 30. The entrance-side substrate 32 is constituted with an insulative material that can transmit light, such as optically isotropic glass. The entrance-side substrate 32 holds the entrance-side polarizing plate 30, the entrance-side transparent electrode 34, and the entrance-side orientation film 36.

The entrance-side transparent electrode 34 is formed over the entire exit-side surface of the entrance-side substrate 32. The entrance-side transparent electrode 34 is constituted with a material, such as ITO (Indium Tin Oxide), that is conductive, and transmits light.

The entrance-side orientation film 36 is formed over the entire exit-side surface of the entrance-side transparent electrode 34. As indicated with an arrow A3, the entrance-side orientation film 36 has a rubbing direction toward the lower left as seen from the exit side. One example of the rubbing direction of the entrance-side orientation film 36 is a direction inclined by 45° toward the lower left from the horizontal direction as seen from the exit side. The rubbing direction of the entrance-side orientation film 36 is parallel with the transmission axis of the entrance-side polarizing plate 30. The entrance-side orientation film 36 orients liquid crystal molecules of the liquid crystal member 38 along the rubbing direction.

The liquid crystal member 38 is provided on the exit side, that is, the user side, of the entrance-side orientation film 36 and the entrance-side polarizing plate 30. One example of a material that constitutes the liquid crystal member 38 is positive nematic liquid crystal. The liquid crystal member 38 modulates the polarization direction of entering linearly polarized light whose polarization direction is parallel with the transmission axis of the entrance-side polarizing plate 30, and outputs the light. The polarization direction is one example of a polarization state. The liquid crystal member 38, when voltage is not applied thereto, rotates the polarization direction of the entering linearly polarized light by 90°. On the other hand, upon application of a voltage, the liquid crystal member 38 rotates the polarization direction of the entering linearly polarized light by a degree smaller than 90°, or does not rotate the polarization direction, and outputs the light.

The exit-side orientation film 40 is provided over the entire exit-side surface of the liquid crystal member 38. In other words, the exit-side orientation film 40 is provided on the user side of the liquid crystal member 38. Thereby, the liquid crystal member 38 is placed between the entrance-side orientation film 36 and the exit-side orientation film 40. As indicated with an arrow A4, the exit-side orientation film 40 has a rubbing direction toward the upper left as seen from the exit side. In other words, the rubbing direction of the exit-side orientation film 40 is a leftward direction which is the same with the rubbing direction of the entrance-side orientation film 36 in the horizontal direction, but is a different upward direction in the vertical direction. One example of the rubbing direction of the exit-side orientation film 40 is a direction inclined by 45° toward the upper left from the horizontal direction as seen from the exit side. The rubbing direction of the exit-side orientation film 40 is orthogonal to the rubbing direction of the entrance-side orientation film 36. The exit-side orientation film 40 orients liquid crystal molecules of the liquid crystal member 38 along the rubbing direction. Thereby, the liquid crystal member 38 is in a twisted nematic mode.

The exit-side transparent electrode 42 is provided over the entire exit-side surface of the exit-side orientation film 40. The entrance-side transparent electrode 34 and the exit-side transparent electrode 42 are provided to face each other. Thereby, the liquid crystal member 38 is provided between the entrance-side transparent electrode 34 and the exit-side transparent electrode 42.

The entrance-side transparent electrode 34 and the exit-side transparent electrode 42 apply a voltage at approximately equal potentials over the entire surface of the liquid crystal member 38. The exit-side transparent electrode 42 is constituted with a material that is the same with that of the entrance-side transparent electrode.

The exit-side substrate 44 is placed on the exit-side of the exit-side surface of the exit-side transparent electrode 42. The exit-side substrate 44 is constituted with a material the same with that of the entrance-side substrate 32. The exit-side substrate 44 holds the exit-side orientation film 40, the exit-side transparent electrode 42, and the exit-side polarizing plate 46. The entrance-side substrate 32 and the exit-side substrate 44 seal the liquid crystal member 38.

The exit-side polarizing plate 46 covers the entire exit-side surface of the exit-side substrate 44. The exit-side polarizing plate 46 is placed farthest on the exit side of the transmittance changing unit 16. As indicated with an arrow A5, the exit-side polarizing plate 46 has a transmission axis inclined clockwise from the horizontal direction as seen from the exit side. One example of the inclination angle of the transmission axis of the entrance-side polarizing plate 30 is 45° counterclockwise from the vertical direction as seen from the exit side. In other words, the transmission axis of the exit-side polarizing plate 46 is parallel with the rubbing direction of the exit-side orientation film 40. Also, the exit-side polarizing plate 46 has a transmission axis that is orthogonal to the transmission axis of the entrance-side polarizing plate 30. Accordingly, the exit-side polarizing plate 46 outputs linearly polarized light whose polarization direction is parallel with the transmission axis among linearly polarized light modulated by the liquid crystal member 38.

Figure 3:
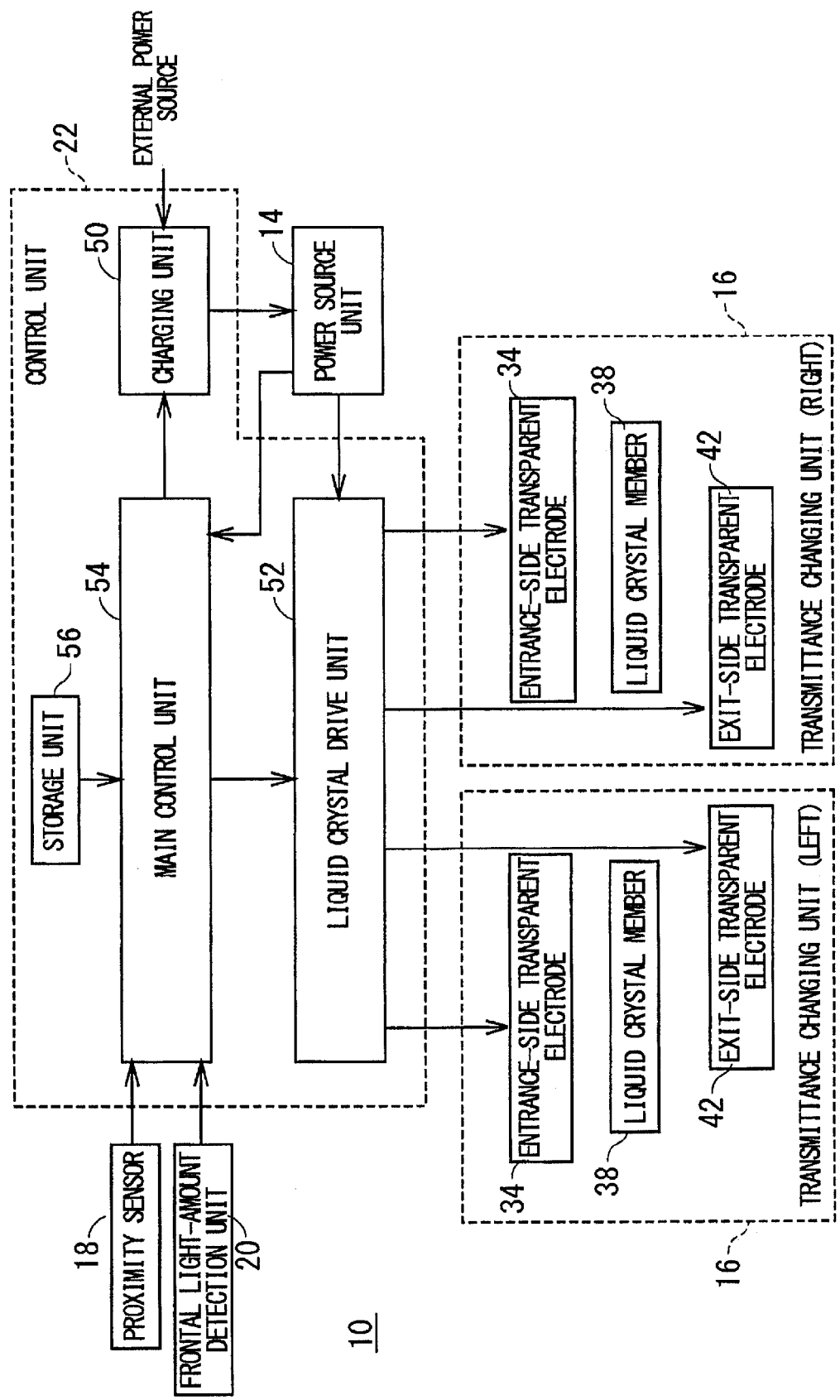
FIG. 3 is a block diagram of a control system of the optical device 10.

FIG. 3 is a block diagram of a control system of the optical device 10. As shown in FIG. 3, the control unit 22 comprises a charging unit 50, a liquid crystal drive unit 52, a main control unit 54 that is one example of a voltage control unit, and a storage unit 56.

The charging unit 50 connects the power source unit 14 and an external power source. The charging unit 50 controls starts and stops of charging of the power source unit 14 based on an instruction from the control unit 22. The charging unit 50 outputs a charging state of the power source unit 14 to the main control unit 54.

The liquid crystal drive unit 52 receives electrical power from the power source unit 14. The liquid crystal drive unit 52 applies a voltage to the liquid crystal member 38 via the entrance-side transparent electrode 34 and the exit-side transparent electrode 42. The liquid crystal drive unit 52 has an operational amplifier and an analog switch.

One example of the main control unit 54 is a microcomputer. The main control unit 54 controls the optical device 10 via the charging unit 50, the liquid crystal drive unit 52, and the storage unit 56.

The main control unit 54 controls the voltage to be applied to the transmittance changing unit 16 via the liquid crystal drive unit 52. Specifically, the main control unit 54, when a presence signal is input thereto from the proximity sensor 18, controls the voltage to be applied to the transmittance changing unit 16 via the entrance-side transparent electrode 34 and the exit-side transparent electrode 42. The main control unit 54, when a presence signal is not input thereto from the proximity sensor 18, does not apply a voltage to the transmittance changing unit 16. In other words, the main control unit 54, when a presence signal is input thereto, turns on the optical device 10, and when a presence signal is not input thereto, turns off the optical device 10. Also, the main control unit 54 switches between an ON state and an OFF state of the power source of the optical device 10 based on a charging state of the power source unit 14 acquired from the charging unit 50.

The main control unit 54 controls the voltage to be applied to the liquid crystal member 38 of the transmittance changing unit 16 based on an electrical signal acquired from the frontal light-amount detection unit 20. Specifically, the main control unit 54 controls the voltage to be applied to the liquid crystal member 38 by switching between a high voltage and a low voltage cyclically. One example of the high voltage is 3 V and one example of the low voltage is 0 V. Note that when applying the high voltage, the main control unit 54 applies +3 V and −3 V alternately every cycle. The main control unit 54 switches between the high voltage and the low voltage at the frequency of 600 Hz. Here, the main control unit 54 synchronizes voltage to be applied to the left and right transmittance changing units 16.

The main control unit 54 controls the transmittance of the transmittance changing unit 16 by means of the duty ratio of the high voltage. The duty ratio of the high voltage mentioned here is a ratio of time during which the high voltage is applied relative to one cycle, that is, the sum of time during which the low voltage is applied and the time during which the high voltage is applied. Note that in the following explanation, a duty ratio that is referred to simply as a duty ratio means a duty ratio of the high voltage. Note that the main control unit 54 controls the voltage so that the transmittance of the transmittance changing unit 16 does not become "zero", that is, so that it does not block light completely. More preferably, the main control unit 54 controls the voltage so that the transmittance of the transmittance changing unit 16 becomes 8% or higher.

Furthermore, the main control unit 54 switches the relationship between the frontal transmittance and the peripheral transmittance among a plurality of different relationships by means of the duty ratio of a voltage to be applied to the transmittance changing unit 16. The frontal transmittance is transmittance for light entering the transmittance changing unit 16 from a frontal direction. For example, the frontal transmittance is transmittance for light entering the transmittance changing unit 16 from a direction whose inclination angle from the vertical direction and the horizontal direction is 0°, that is, from the directly frontal direction. The peripheral transmittance is transmittance for light entering the transmittance changing unit 16 from a direction inclined toward the vertical direction from the entrance direction of light to which the frontal transmittance applies. In the present embodiment, the peripheral transmittance is transmittance for light entering the transmittance changing unit 16 from a direction inclined upward from the entrance direction of light to which the frontal transmittance applies. For example, the peripheral transmittance is transmittance for light entering the transmittance changing unit 16 from a direction whose inclination angle from the vertical direction is 45° to 60°. Note that the plurality of relationships of transmittance is described below.

Figure 4:
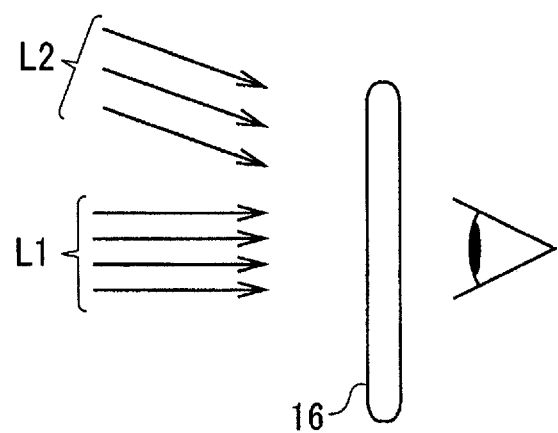
FIG. 4 is a diagram for explaining a relationship between the frontal transmittance and the peripheral transmittance.

FIG. 4 is a diagram for explaining a relationship between the frontal transmittance and the peripheral transmittance. The frontal transmittance is transmittance for light entering the transmittance changing unit 16 from a frontal direction indicated with an arrow L1 in FIG. 4. Here, the eyes of a user are assumed to be positioned behind the center of the transmittance changing unit 16. Accordingly, when the frontal transmittance is high, the user sees outside while the transmittance of a central part of the transmittance changing unit 16 is high.

The peripheral transmittance is transmittance for light entering the transmittance changing unit 16 from a direction indicated with an arrow L2 in FIG. 4 inclined toward the vertical direction from a frontal direction, for example, from an obliquely upward direction. One example of a direction from which light to which the peripheral transmittance applies enters is a direction that connects the eyes of a user and an upper end portion of the transmittance changing unit 16. Note that a direction from which light to which the peripheral transmittance applies may be a direction of the upper limit of a sight of humans. When the peripheral transmittance is low, a user sees the outside with the transmittance of an upper portion of the transmittance changing unit 16 being low.

Figure 5:
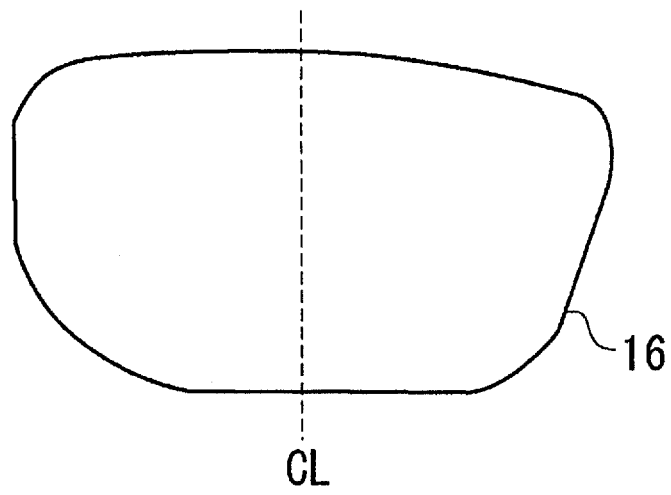
FIG. 5 is a diagram for explaining a plurality of relationships of the transmittance changing unit 16.
Figure 6:
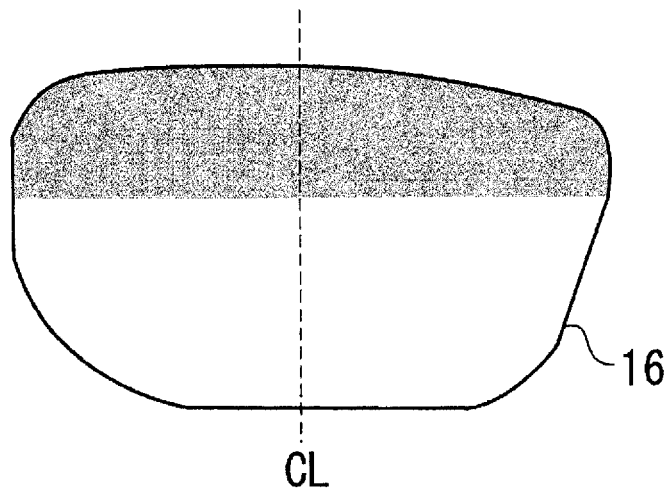
FIG. 6 is a diagram for explaining a plurality of relationships of the transmittance changing unit 16.

FIG. 5 and FIG. 6 are diagrams for explaining a plurality of relationships of the transmittance changing unit 16. The main control unit 54 acquires information about a light amount from the frontal light-amount detection unit 20, and calculates a light amount of the outside. The main control unit 54 compares the calculated light amount with a light amount threshold Th0 stored in the storage unit 56. Upon judging that the light amount is lower than light amount threshold Th0, the main control unit 54 does not apply a voltage to the liquid crystal member 38 of the transmittance changing unit 16. Thereby, the liquid crystal member 38 rotates entering linearly polarized light by 90°, and outputs the light. As a result of this, the transmittance changing unit 16 has a relationship shown in FIG. 5. The relationship shown in FIG. 5 corresponds to a state where the frontal transmittance and the peripheral transmittance are the highest. In other words, the optical device 10 is in a normally white mode in which the transmittance becomes the highest when a voltage is not being applied thereto. The relationship shown in FIG. 5 is one example of a first relationship.

On the other hand, upon judging that the light amount is equal to or higher than the light amount threshold Th0, the main control unit 54 applies a high voltage and a low voltage to the liquid crystal member 38 of the transmittance changing unit 16 cyclically at a predetermined duty ratio. Thereby, the liquid crystal member 38 rotates entering linearly polarized light partially or entirely by a degree smaller than 90°, and outputs the light. As a result of this, the transmittance changing unit 16 has a relationship shown in FIG. 6. The relationship shown in FIG. 6 corresponds to a state where at least the peripheral transmittance is lower than the peripheral transmittance shown in FIG. 5. The average transmittance of the transmittance changing unit 16 in a frontal direction and a direction inclined from the frontal direction shown in FIG. 5 is higher than the average transmittance of the transmittance changing unit 16 in a frontal direction and a direction inclined from the frontal direction shown in FIG. 6. The average transmittance is, for example, the average of transmittance at the center line CL of the transmittance changing unit 16 along the vertical direction from 0° relative to the horizontal direction to a direction that corresponds to the upper-end (for example, 60°) of the transmittance changing unit 16.

Also, when switched from FIG. 5 to FIG. 6, changes in the frontal transmittance are smaller than changes in the peripheral transmittance. The ratio of the peripheral transmittance relative to the frontal transmittance shown in FIG. 5 is equal to or higher than the ratio of the peripheral transmittance relative to the frontal transmittance shown in FIG. 6. Also, a difference obtained by subtracting the frontal transmittance shown in FIG. 6 from the frontal transmittance shown in FIG. 5 is equal to or smaller than a difference obtained by subtracting the peripheral transmittance shown in FIG. 6 from the peripheral transmittance shown in FIG. 5. In the relationship shown in FIG. 6, a user sees the outside with light from an upward direction being blocked more than light from a frontal direction. The relationship shown in FIG. 6 is one example of a second relationship.

Next, a relationship between the rubbing direction and transmission axis, and the frontal transmittance and peripheral transmittance of the transmittance changing unit 16 is explained. First, the transmittance changing unit that has the rubbing direction and transmission axis that are different from those of the transmittance changing unit 16 shown in FIG. 2 is explained.

FIG. 7, FIG. 8, FIG. 9, FIG. 10, and FIG. 11 are exploded perspective views of the transmittance changing units 16 that have the rubbing directions and transmission axes that are different from those of the transmittance changing unit 16 shown in FIG. 2. Note that in FIG. 7 to FIG. 11, the configuration other than the entrance-side polarizing plate 30, the entrance-side orientation film 36, the exit-side orientation film 40, and the exit-side polarizing plate 46 is omitted. In the explanation from FIG. 7 to FIG. 11, the rubbing directions and the directions of the transmission axes are defined as directions as seen from the exit side, that is, from a user. Among the rubbing direction and transmission axis of each transmittance changing unit in FIG. 7 to FIG. 11, explanation of the rubbing direction and transmission axis that are the same with those in FIG. 2 is omitted.

Figure 7:
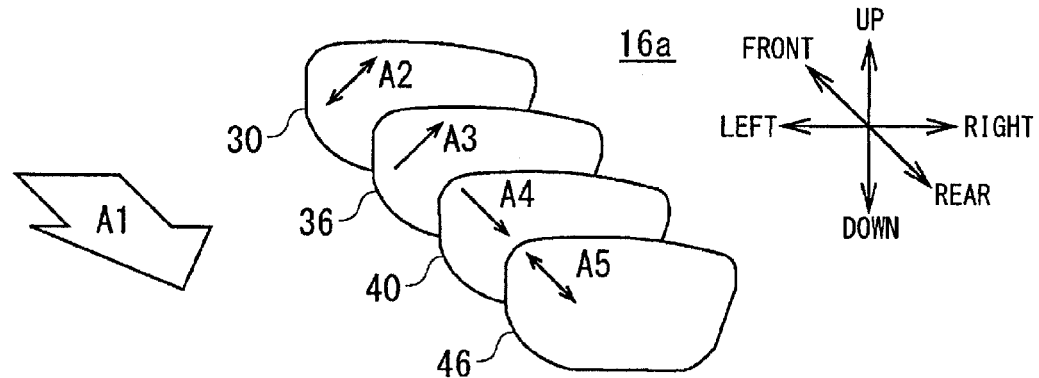
FIG. 7 is an exploded perspective view of the transmittance changing unit 16 that has a rubbing direction and a transmission axis that are different from those of the transmittance changing unit 16 shown in FIG. 2.

In a transmittance changing unit 16a shown in FIG. 7, the rubbing direction of the entrance-side orientation film 36 is inclined by 45° from the horizontal direction toward the upper right. The rubbing direction of the exit-side orientation film 40 of the transmittance changing unit 16a is inclined by 45° from the horizontal direction toward the lower right.

Figure 8:
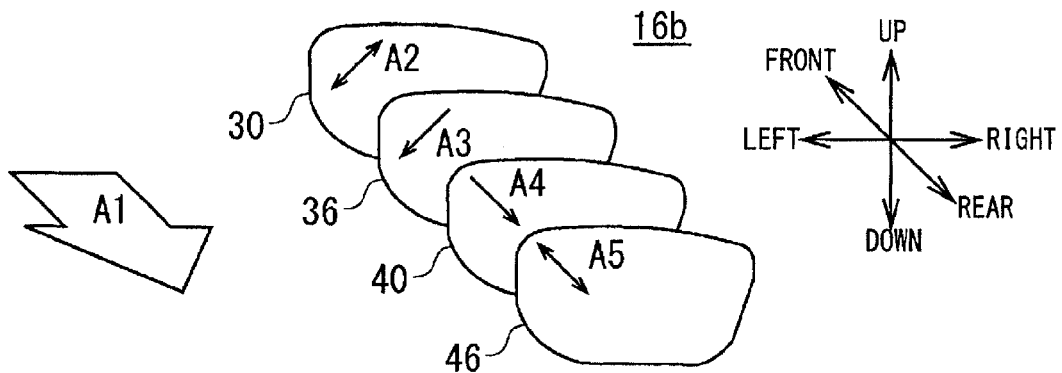
FIG. 8 is an exploded perspective view of the transmittance changing unit 16 that has a rubbing direction and a transmission axis that are different from those of the transmittance changing unit 16 shown in FIG. 2.

In the transmittance changing unit 16b shown in FIG. 8, the rubbing direction of the exit-side orientation film 40 is inclined by 45° from the horizontal direction toward the lower right.

Figure 9:
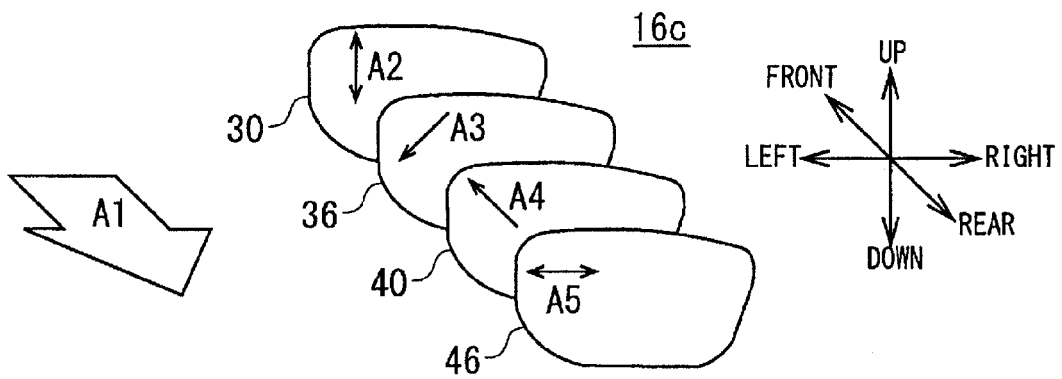
FIG. 9 is an exploded perspective view of the transmittance changing unit 16 that has a rubbing direction and a transmission axis that are different from those of the transmittance changing unit 16 shown in FIG. 2.

In the transmittance changing unit 16c shown in FIG. 9, the transmission axis of the entrance-side polarizing plate 30 is parallel with the vertical direction. The transmission axis of the exit-side polarizing plate 46 of the transmittance changing unit 16c is parallel with the horizontal direction.

Figure 10:
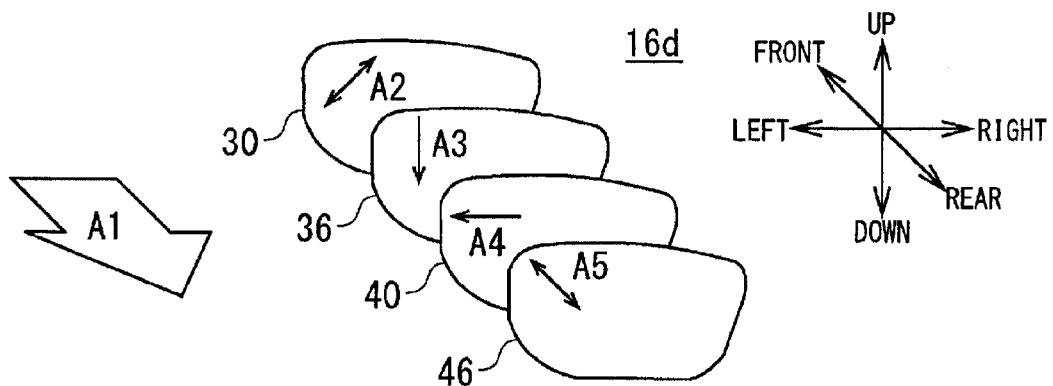
FIG. 10 is an exploded perspective view of the transmittance changing unit 16 that has a rubbing direction and a transmission axis that are different from those of the transmittance changing unit 16 shown in FIG. 2.

In the transmittance changing unit 16d shown in FIG. 10, the rubbing direction of the entrance-side orientation film 36 is a downward direction parallel with the vertical direction. The rubbing direction of the exit-side orientation film 40 of the transmittance changing unit 16d is a leftward direction that is parallel with the horizontal direction.

Figure 11:
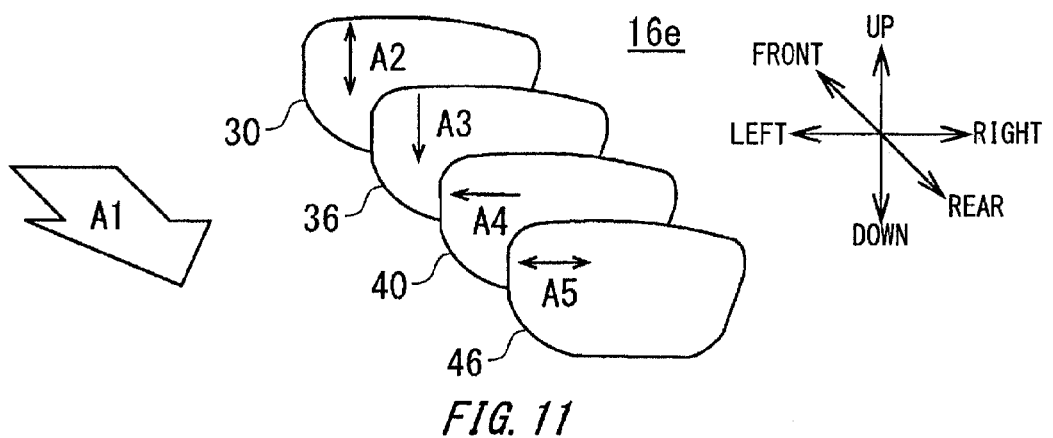
FIG. 11 is an exploded perspective view of the transmittance changing unit 16 that has a rubbing direction and a transmission axis that are different from those of the transmittance changing unit 16 shown in FIG. 2.

In the transmittance changing unit 16e shown in FIG. 11, the transmission axis of the entrance-side polarizing plate 30 is parallel with the vertical direction. The rubbing direction of the entrance-side orientation film 36 of the transmittance changing unit 16e is a downward direction that is parallel with the vertical direction. The rubbing direction of the exit-side orientation film 40 of the transmittance changing unit 16e is a leftward direction that is parallel with the horizontal direction. The transmission axis of the exit-side polarizing plate 46 of the transmittance changing unit 16e is parallel with the horizontal direction.

Figure 12:
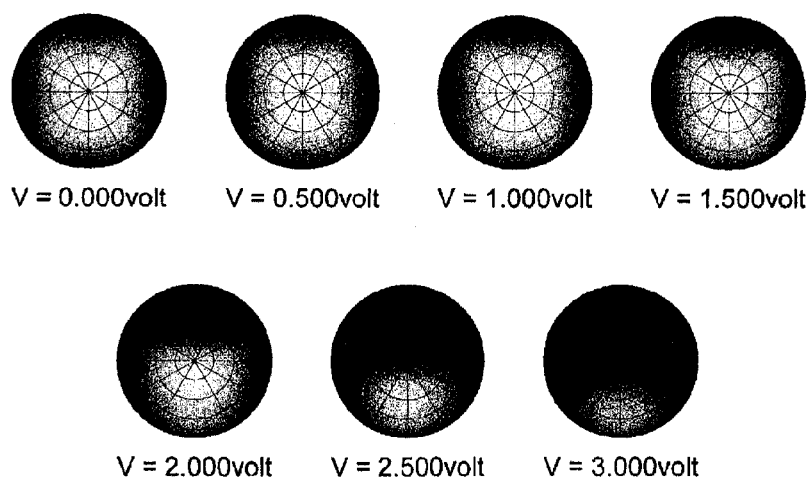
FIG. 12 is a diagram for explaining a relationship between voltages applied to a liquid crystal member 38 and changes in transmittance in the transmittance changing unit 16 shown in FIG. 2.

FIG. 12 is a diagram for explaining a relationship between voltages applied to the liquid crystal member 38 and changes in transmittance in the transmittance changing unit 16 shown in FIG. 2. FIG. 13, FIG. 14, FIG. 15, FIG. 16, and FIG. 17 are diagrams for explaining relationships between voltages applied to the liquid crystal member 38 and changes in transmittance in the transmittance changing unit 16 shown in FIG. 7, FIG. 8, FIG. 9, FIG. 10, and FIG. 11, respectively. FIG. 12 to FIG. 17 show results of simulation. The center of each circle in FIG. 12 to FIG. 17 corresponds to a frontal direction with inclination of 0°. The n-th circle from the inside in FIG. 12 to FIG. 17 corresponds to the direction inclined by (20×n)° from the frontal direction. Accordingly, the smallest circle corresponds to the direction inclined by 20° from the frontal direction. Also, the outermost circle corresponds to the direction inclined by 80°.

Note that in general eye glasses, upper end portions of the lenses are located in a direction inclined by 45° to 60° from the frontal direction to the upward direction, In FIG. 12 to FIG. 17, whiter areas correspond to higher transmittance. As the area becomes blacker, transmittance becomes lower. Although FIG. 12 to FIG. 17 correspond to states where a direct current voltage is being applied, states with the approximately same transmittance can be attained even with a voltage that changes cyclically, if the average voltage is equal to the voltage shown in FIG. 12 to FIG. 17.

Figure 13:
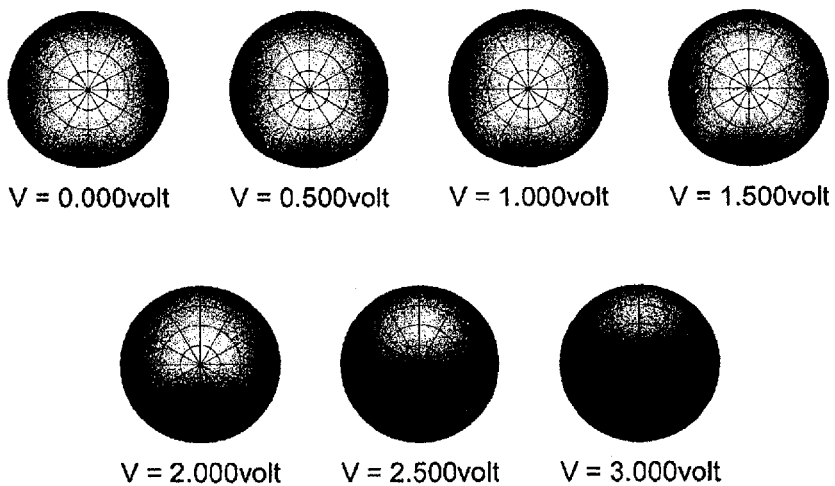
FIG. 13 is a diagram for explaining a relationship between voltages applied to the liquid crystal member 38 and changes in transmittance in the transmittance changing unit 16 shown in FIG. 7.
Figure 14:
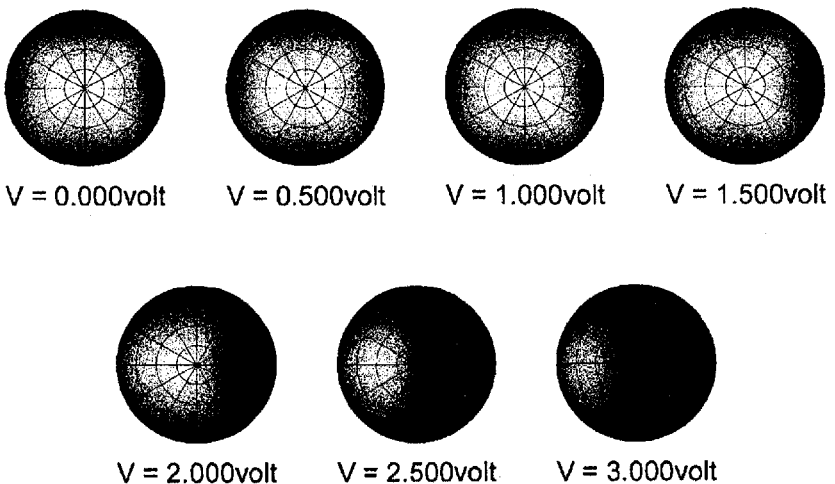
FIG. 14 is a diagram for explaining a relationship between voltages applied to the liquid crystal member 38 and changes in transmittance in the transmittance changing unit 16 shown in FIG. 8.

As shown in FIG. 12, the transmittance changing unit 16 shown in FIG. 2 has peripheral transmittance that becomes lower gradually from an upper portion thereof as the voltage being applied becomes higher. On the other hand, in the transmittance changing unit 16 shown in FIG. 2, the distribution of the transmittance in the horizontal direction changes little even when the voltage becomes higher. As shown in FIG. 13, the transmittance changing unit 16a shown in FIG. 7 has peripheral transmittance that becomes lower gradually from a lower portion thereof as the voltage being applied becomes higher. On the other hand, in the transmittance changing unit 16a shown in FIG. 7, the distribution of the transmittance in the horizontal direction changes little even when the voltage becomes higher. Accordingly, in the transmittance changing units 16, 16a shown in FIG. 2 and FIG. 7, changes in the transmittance in the vertical direction are larger than changes in the transmittance in the horizontal direction. As shown in FIG. 14, the transmittance changing unit 16b shown in FIG. 8 has peripheral transmittance that becomes lower gradually from an upper right portion thereof as the voltage being applied becomes higher. On the other hand, in the transmittance changing unit 16b shown in FIG. 8, the distribution of the transmittance in the vertical direction changes little even when the voltage becomes higher.

Here, the rubbing directions on the entrance side and exit side of the transmittance changing unit 16 shown in FIG. 2 are respectively parallel with the rubbing directions on the entrance side and exit side of the transmittance changing unit 16a, 16b shown in FIG. 7 and FIG. 8, but are oriented differently. Accordingly, an area at which transmittance starts becoming lower depends on how the rubbing direction is oriented, that is, whether the direction is positive or negative.

Figure 15:
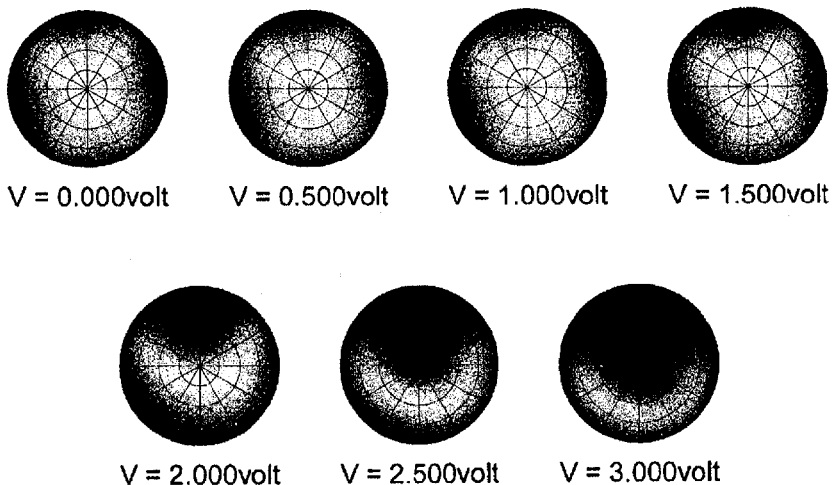
FIG. 15 is a diagram for explaining a relationship between voltages applied to the liquid crystal member 38 and changes in transmittance in the transmittance changing unit 16 shown in FIG. 9.

As shown in FIG. 15, the transmittance changing unit 16c shown in FIG. 9 has peripheral transmittance that becomes lower gradually from an upper portion thereof as the voltage being applied becomes higher. However, it can be known that in the transmittance changing unit 16c, an area in which the peripheral transmittance becomes lower is narrow in the horizontal direction. Here, the transmission axes of the entrance-side polarizing plate 30 and the exit-side polarizing plate 46 of the transmittance changing unit 16 shown in FIG. 2 are respectively different from the transmission axes of the entrance-side polarizing plate 30 and the exit-side polarizing plate 46 of the transmittance changing unit 16c shown in FIG. 9. Accordingly, it can be known that the size, in the horizontal direction, of an area in which the transmittance becomes lower depends on the transmission axis.

Figure 16:
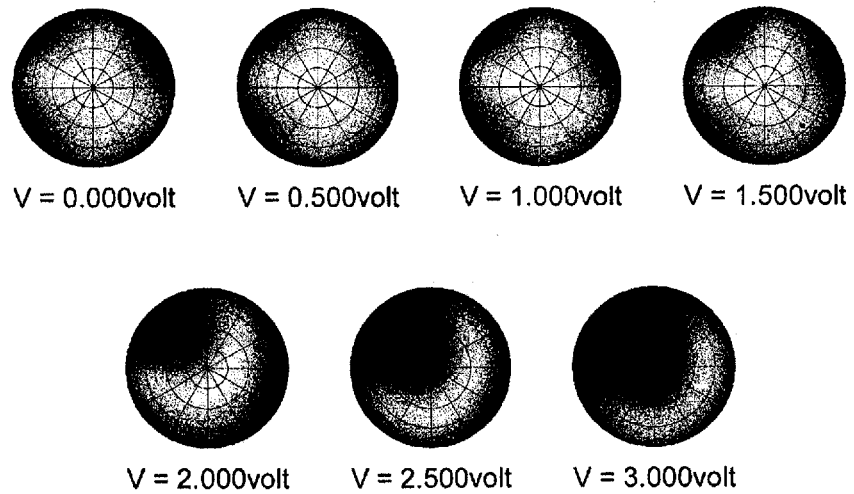
FIG. 16 is a diagram for explaining a relationship between voltages applied to the liquid crystal member 38 and changes in transmittance in the transmittance changing unit 16 shown in FIG. 10.

As shown in FIG. 16, the transmittance changing unit 16d shown in FIG. 10 has peripheral transmittance that becomes lower gradually from the upper left as the voltage being applied becomes higher. Also, it can be known that in the transmittance changing unit 16d, an area in which the peripheral transmittance becomes lower is narrow as compared with the example shown in FIG. 12. Thereby, the direction in which the peripheral transmittance becomes lower depends on the rubbing direction, and the size of an area in which the peripheral transmittance becomes lower depends on a relationship between the rubbing direction and the transmission axis.

Figure 17:
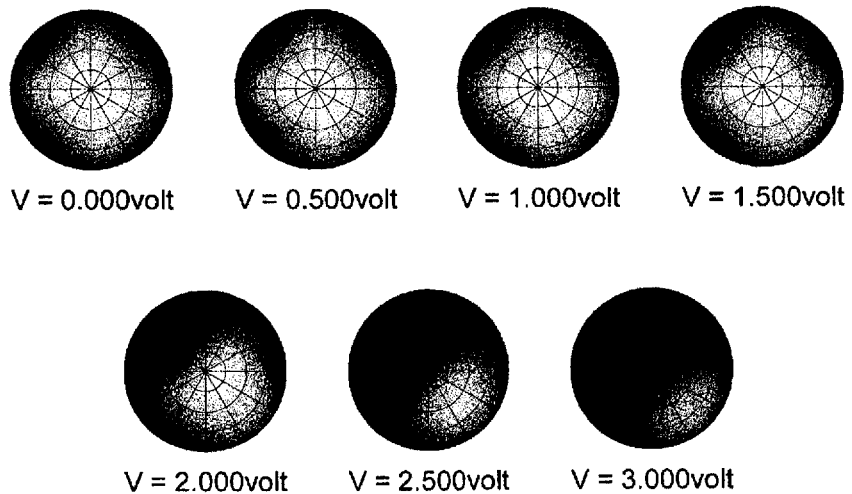
FIG. 17 is a diagram for explaining a relationship between voltages applied to the liquid crystal member 38 and changes in transmittance in the transmittance changing unit 16 shown in FIG. 11.

As shown in FIG. 17, the transmittance changing unit 16e shown in FIG. 11 has peripheral transmittance that becomes lower gradually from the upper left as the voltage being applied becomes higher. Also, it can be known that in the transmittance changing unit 16e, an area in which the peripheral transmittance becomes lower is large as compared with the example shown in FIG. 16. Thereby, it can be known that if the rubbing direction and polarization direction on the entrance side are parallel, and the rubbing direction and polarization direction on the exit side are parallel, an area in which the peripheral transmittance becomes lower becomes large.

Figure 18:
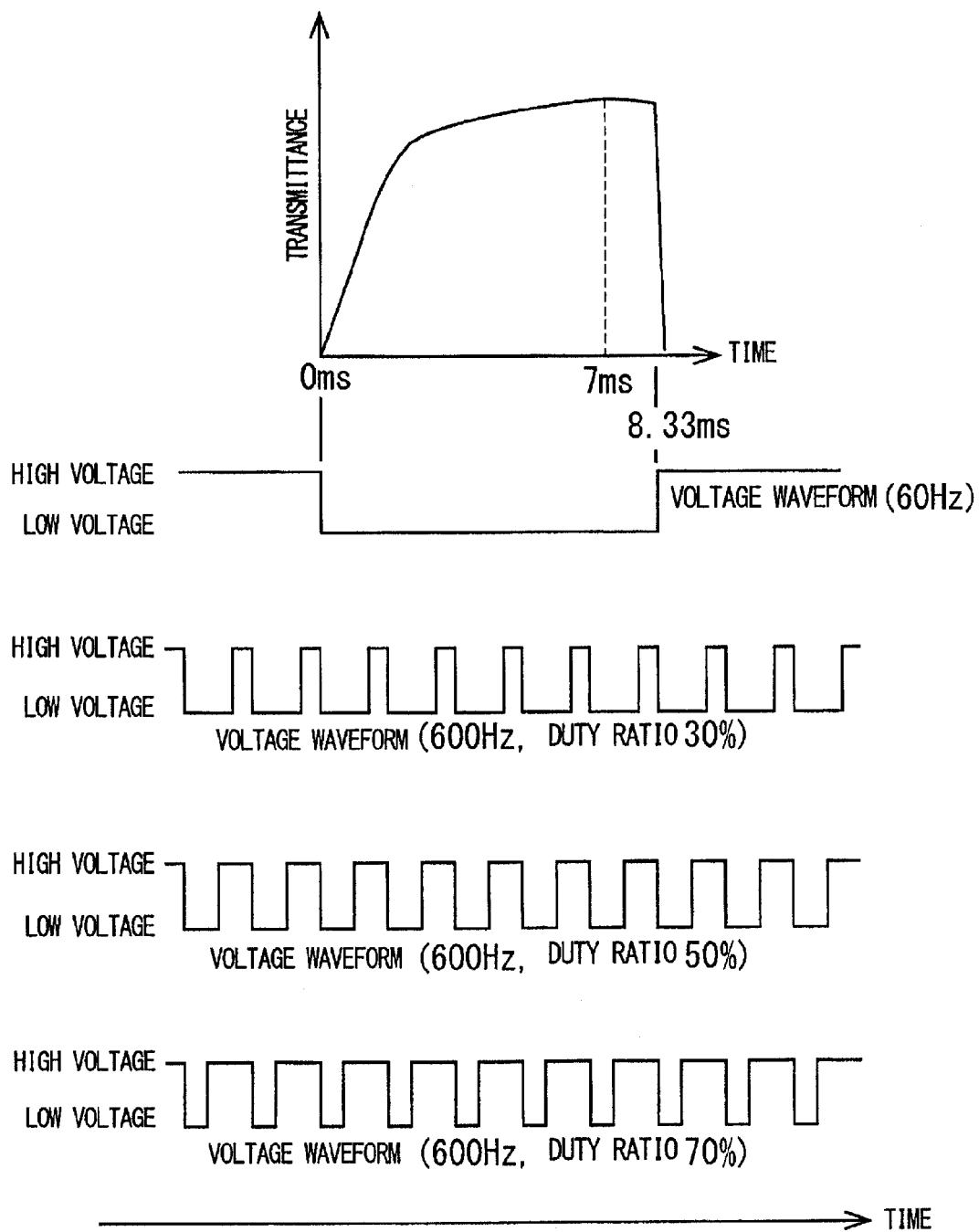
FIG. 18 is a diagram illustrating a relationship between the duty ratio of a voltage applied to the liquid crystal member 38 and time required for the transmittance to stabilize.

FIG. 18 is a diagram illustrating a relationship between the duty ratio of a voltage applied to the liquid crystal member 38 and time required for the transmittance to stabilize. In the example shown in FIG. 18, the liquid crystal member 38 is assumed to be in a super twisted nematic mode. As shown in FIG. 18, the transmittance of the transmittance changing unit 16 becomes an approximately maximum value and can no longer become higher when the voltage is switched from a high voltage to a low voltage.

As shown in FIG. 18, the time required for the transmittance of the transmittance changing unit 16 to stabilize when changing from a minimum value to a maximum value after the voltage is switched from a high voltage to a low voltage is about 7 ms. The time required for the transmittance to stabilize mentioned here is time required for the transmittance of the transmittance changing unit 16, which is at first a minimum value, to be a maximum value by switching the voltage. Note that because one cycle of 60 Hz is 16.67 ms, time during which a low voltage is being applied in one cycle is 8.33 ms. When the transmittance changes from a minimum value to a maximum value, liquid crystal molecules of the liquid crystal member 38 returns from a state where they are arrayed linearly to a state where they are twisted from the entrance side to the exit side. On the other hand, when the transmittance of the transmittance changing unit 16 changes from the maximum value to the minimum value, time required for the transmittance to stabilize after switching from a low voltage to a high voltage is about 300 μs. Accordingly, time required for the transmittance to be high and stabilize is longer than time required for the transmittance to be low and stabilize. Note that when the transmittance changes from a maximum value to a minimum value, liquid crystal molecules of the liquid crystal member 38 change from a state where they are twisted from the entrance side to the exit side to a state where they are arrayed linearly.

Note that in a twisted nematic mode, when the transmittance of the transmittance changing unit 16 changes from a minimum value to a maximum value, time required for the transmittance to stabilize after switching from a high voltage to a low voltage is about 5 ms. However, in a twisted nematic mode, it takes about 1 ms for the transmittance to start changing after switching from a high voltage to a low voltage. In a twisted nematic mode, when the transmittance of the transmittance changing unit 16 changes from a maximum value to a minimum value, time required for the transmittance to stabilize after switching from a low voltage to a high voltage is about 300 μs.

As shown in a lower portion of FIG. 18, the main control unit 54 applies a high voltage at 600 Hz, for example. As shown in FIG. 18, the main control unit 54 switches between a high voltage and a low voltage at a cycle that is shorter than the sum of time required for the transmittance of the transmittance changing unit 16 when changing from a minimum value to a maximum value by switching the voltage and time required for the transmittance of the transmittance changing unit 16 to stabilize when changing from a maximum value to a minimum value by switching the voltage. In more detail, the main control unit 54 switches between a high voltage and a low voltage at a cycle that is shorter than time required for the transmittance of the transmittance changing unit 16 to stabilize when changing from a minimum value to a maximum value by switching the voltage. Here, as shown in a lower portion of FIG. 18, a plurality of duty ratios exist for one cycle. As mentioned above, the plurality of duty ratios are related to the transmittance of the transmittance changing unit 16. A specific example of this relationship is explained.

Figure 19:
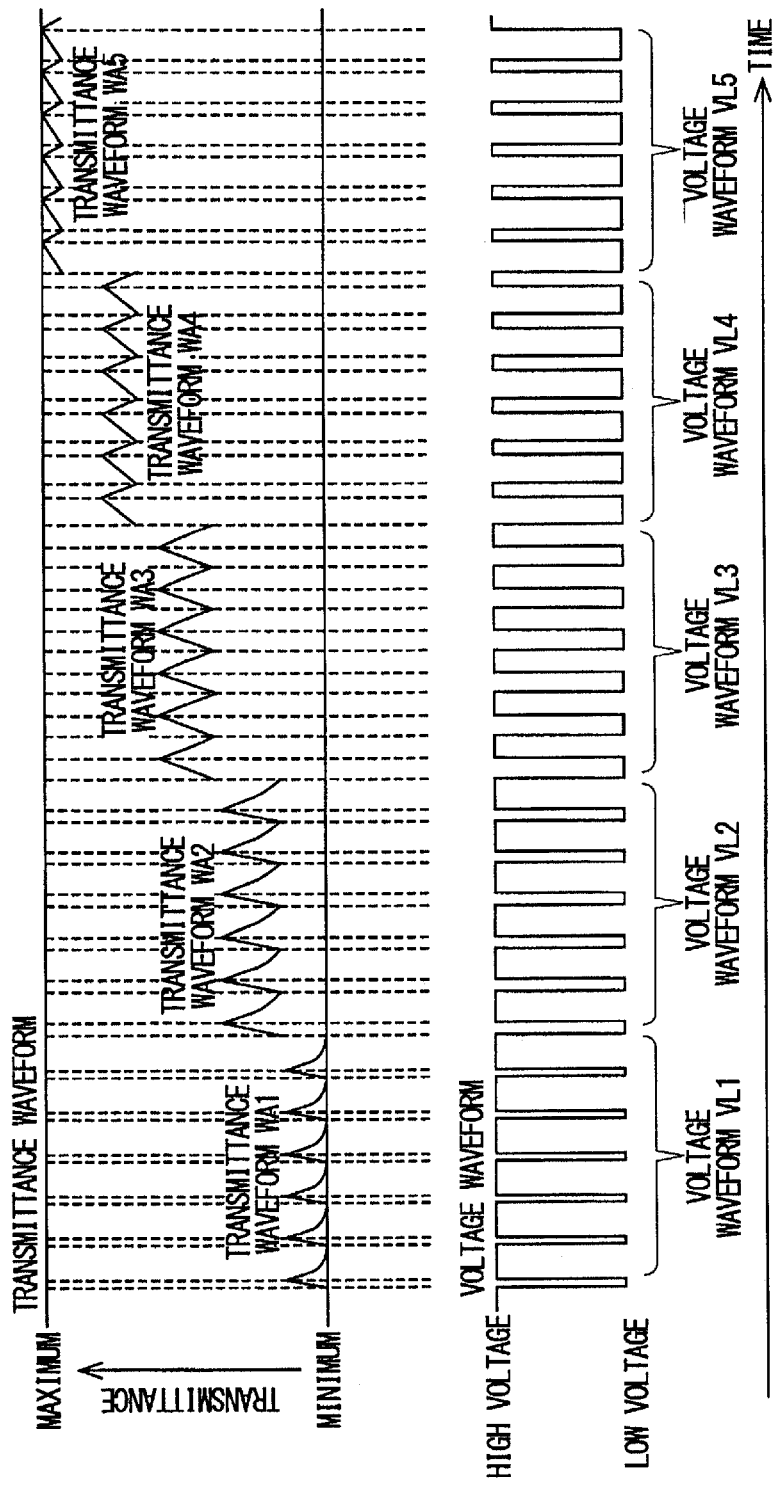
FIG. 19 is a graph that shows a relationship between duty ratios and the transmittance of the transmittance changing unit 16.

FIG. 19 is a graph that shows a relationship between duty ratios and the transmittance of the transmittance changing unit 16. The lower graph in FIG. 19 shows a waveform of a voltage applied to the transmittance changing unit 16. In the lower graph in FIG. 19, the cycles of a voltage waveform VL1 to a voltage waveform VL5 are the same. Among the voltage waveform VL1 to the voltage waveform VL5, the value of a high voltage is the same, and the value of a low voltage is the same. The duty ratio of a high voltage becomes lower gradually in the order of the voltage waveform VL1 to the voltage waveform VL5. A transmittance waveform WA1 to a transmittance waveform WA5 in the upper graph in FIG. 19 correspond to a graph of the frontal transmittance of the transmittance changing unit 16 to which the voltage waveform VL1 to the voltage waveform VL5 are applied, respectively.

As shown in FIG. 19, the transmittance of the transmittance changing unit 16 swings in a partial area between the maximum value and the minimum value because the cycle of the voltage being applied is shorter than time required for the liquid crystal member 38 to stabilize. Furthermore, the duty ratio of a high voltage is related to the transmittance. Specifically, time with a high voltage becomes longer as the duty ratio becomes higher like the voltage waveform VL1 or the like. Accordingly, because time during which the transmittance is high becomes short, the cumulative transmittance that is obtained by adding the transmittance over time becomes low. On the other hand, time with a low voltage becomes longer as the duty ratio become lower like the voltage waveform VL5. Accordingly, because time during which the transmittance is high becomes long, the cumulative transmittance becomes high. Note that in the present embodiment, the main control unit 54 switches the transmittance of the transmittance changing unit 16 by means of the voltage waveform WA1 and a state where voltage is not being applied.

Figure 20:
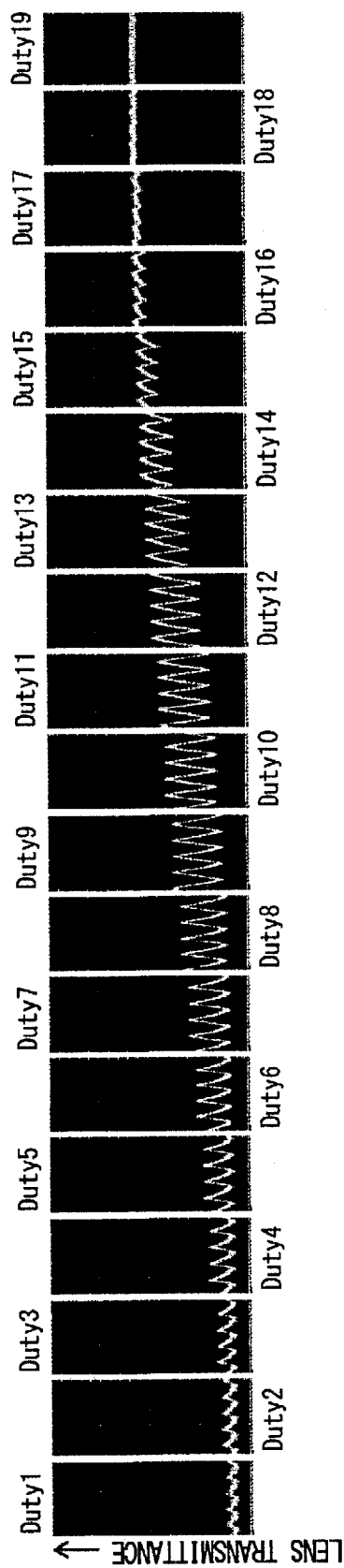
FIG. 20 is an experimental result of a transmittance waveform WA relative to a plurality of duty ratios of a high voltage.

FIG. 20 is an experimental result of a transmittance waveform WA relative to a plurality of duty ratios of a high voltage. FIG. 21 shows numerical data of FIG. 20. DutyNos in FIG. 21 correspond to the numbers described in an upper portion of FIG. 20. Data of FIG. 20 and FIG. 21 was obtained by applying 90°-twisted TN mode liquid crystal as the liquid crystal member 38. Data of FIG. 20 and FIG. 21 was obtained by applying a voltage at the cycle of 2.2 ms, that is, at the frequency of 454 Hz. Also, the angle between the polarization direction of the entrance-side polarizing plate 30 and the polarization direction on the exit side was 90°. As can be known from FIG. 20 and FIG. 21, the cumulative transmittance becomes higher as the duty ratio of a high voltage becomes lower.

Figure 22:
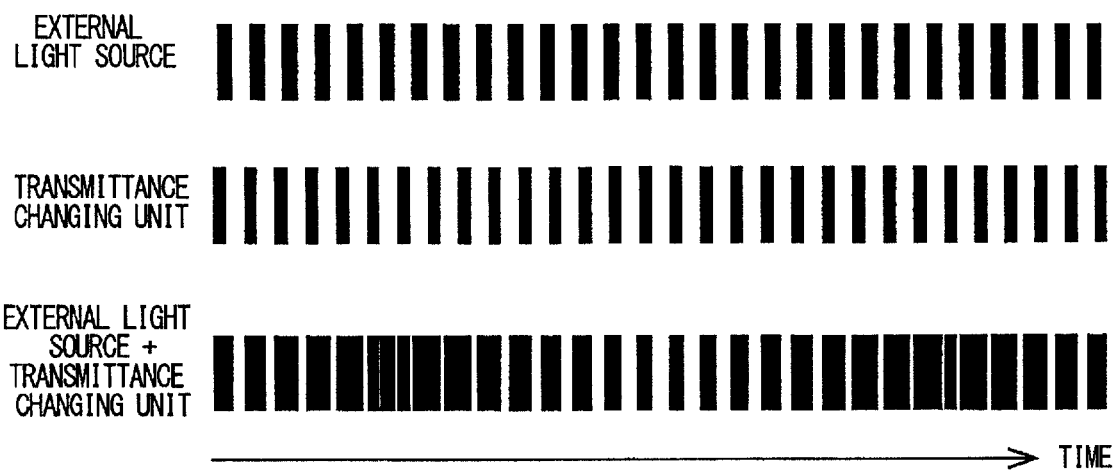
Figure 23:
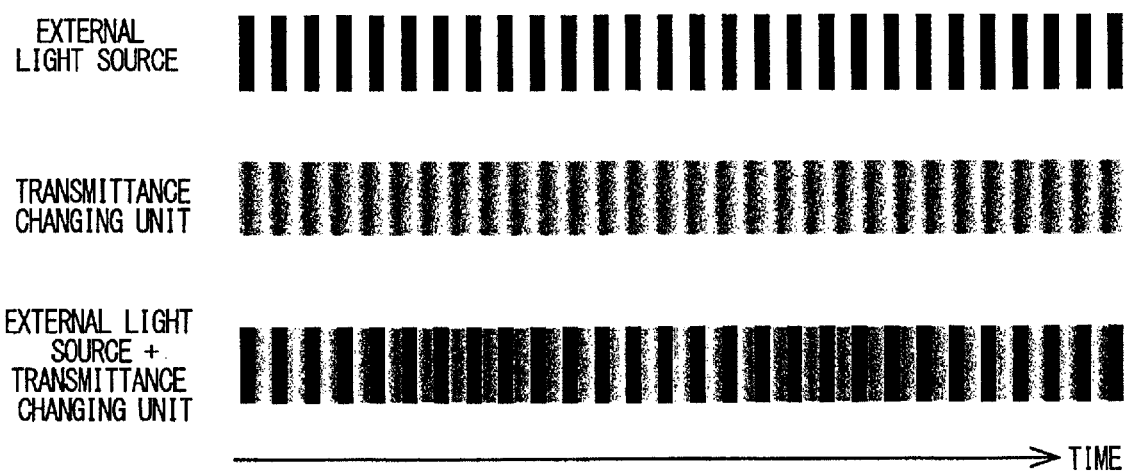
Figure 24:
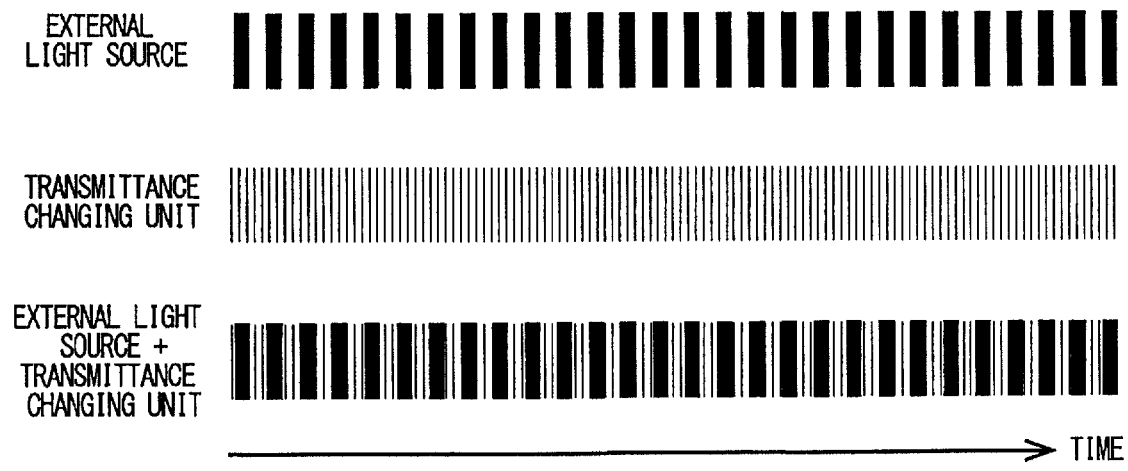
FIG. 24 is a diagram illustrating a case where the cycle of a voltage applied to the transmittance changing unit 16 is considerably short as in the present embodiment, as compared with the cycle of an external light source.

Next, a relationship between flicker and the cycle of the voltage being applied is explained. FIG. 22 is a diagram illustrating a case where the cycle of an external light source and the cycle of a voltage applied to the transmittance changing unit 16 are similar. FIG. 23 is a diagram illustrating a case where duty-control is performed on the voltage when the cycle of an external light source and the cycle of a voltage applied to the transmittance changing unit 16 are similar. FIG. 24 is a diagram illustrating a case where the cycle of a voltage applied to the transmittance changing unit 16 is considerably short as in the present embodiment, as compared with the cycle of an external light source. The top diagrams in FIG. 22 to FIG. 24 illustrate temporal changes in brightness or darkness of the external power source. In the top diagrams, black areas indicate a dark state where a light source is not turned on, and white areas indicate a bright state where the light source is turned on. The middle diagrams in FIG. 22 to FIG. 24 indicate temporal changes in the transmittance of the transmittance changing unit 16. In the middle diagrams, areas whose colors are closer to black indicate low transmittance, and areas whose colors are closer to white indicate high transmittance. In FIG. 23, the transmittance changes gradually and continuously. Note that in FIG. 24, although an area with low transmittance is indicated with straight black lines, when they are seen in an expanded view, the transmittance changes continuously as in FIG. 23. The bottom diagrams in FIG. 22 to FIG. 24 are obtained by overlapping the respective top diagrams with the respective middle diagrams. Note that one example of the external light source is a traffic light, a fluorescent light or the like that blinks at 50 Hz to 120 Hz approximately.

As shown in the bottom diagram of FIG. 22, when the cycle of the external light source and the cycle of the voltage being applied are similar, an area where black areas are continuous increases. The time during which black areas are continuous corresponds to either a state where the external light source is turned off or a state where the transmittance is low. Accordingly, if the line of sight of a user is oriented toward the direction of, for example, a traffic light while he/she is wearing the optical device, the time during which he/she cannot see the light of the traffic light as continuous light becomes longer. As a result of this, the user visually recognizes flicker that is different from blinking of the traffic light.

On the other hand, if the cycle of a voltage applied to the transmittance changing unit 16 explained in FIG. 19 is shorter than time required for the liquid crystal member 38 to stabilize, the transmittance of the transmittance changing unit 16 changes continuously and swings in a partial area between the maximum value and the minimum value as shown in the middle diagram of FIG. 23

In other words, the transmittance of the transmittance changing unit 16 is neither a constant value, nor a maximum value and a minimum value. Thereby, the transmittance of the transmittance changing unit 16 is integrated and averaged. In this case, the user can always visually recognize constant light passing through the transmittance changing unit 16. Accordingly, for example, even in a state of the transmittance waveform WA1 shown in FIG. 19 in which the transmittance is the lowest, as shown in the bottom diagram in FIG. 23, the transmittance changing unit 16 can lessen the blinking state, and make the time during which light from the traffic light cannot be seen continuously coincide with the lights-out time of the traffic light; therefore, flicker can be suppressed.

Also, as shown in the bottom diagram of FIG. 24, if the cycle of a voltage applied to the transmittance changing unit 16 is considerably shorter than the cycle of the external light source, the time during which black is continuous becomes time that is almost the same with the time of a dark state of the external light source. Accordingly, when the user can see the traffic light while wearing the optical device 10, he/she can see the light in a blinking state that is almost the same with the actual blinking state of the traffic light. Thereby, the transmittance changing unit 16 can suppress flicker.

Furthermore, in the optical device 10, the transmittance of the transmittance changing unit 16 swings in a partial area between the maximum value and the minimum value because the cycle of a voltage applied to the transmittance changing unit 16 is shorter than the time required for the liquid crystal member 38 to stabilize. Accordingly, because the optical device 10 can integrate and average the transmittance of the transmittance changing unit 16, it can average unevenness of the transmittance of the transmittance changing unit 16 within a plane that is caused by a constant voltage being applied. As a result of this, the optical device 10 can reduce unevenness of the transmittance depending on view angles.

Figure 25:
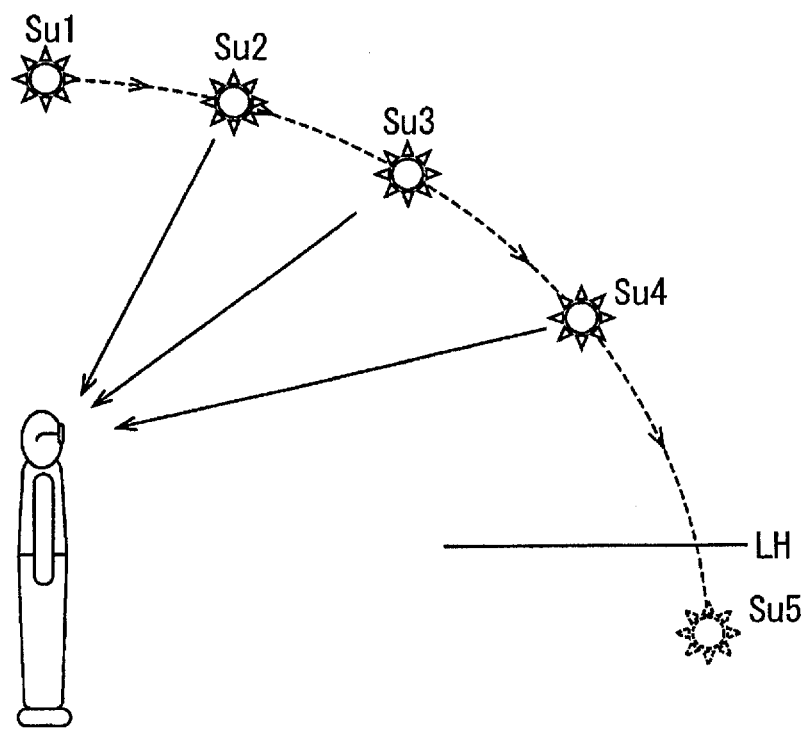
FIG. 25 is a diagram for explaining positions of the sun.
Figure 26:
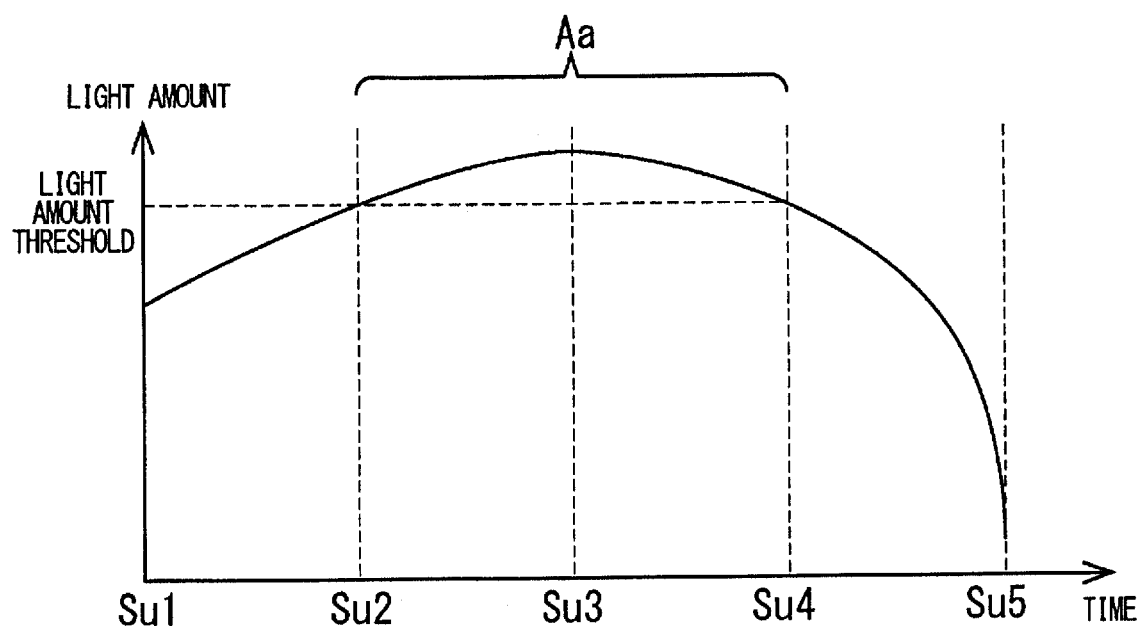
FIG. 26 is a graph that shows a relationship between the positions of the sun and the illuminance.

Next, one example of a method of setting a light amount threshold is explained. FIG. 25 is a diagram for explaining positions of the sun. FIG. 26 is a graph that shows a relationship between the positions of the sun and the illuminance.

As shown in FIG. 25, the position of the sun which is directly above the user is denoted with Su1. As the time elapses, positions of the sun as it gradually goes down on the west are denoted with positions Su 2 to Su5. At the position Su 4, the sun is setting. As the position Su5, the sun is at the horizon LH, or below the horizontal line LH, but the westward direction is bright.

As shown in FIG. 26, among these position Su1 to position Su5, the light amount detected by the frontal light-amount detection unit 20 increases while the sun moves from the position Su1 to the position Su3, and decreases while the sun moves from the position Su3 to the position Su5. Accordingly, the light amount threshold Th0 is set such that the transmittance of the transmittance changing unit 16 lowers in an area Aa from the position Su 2 to the position Su 4 in which there is strong direct sunlight and the light amount is high.

Figure 27:
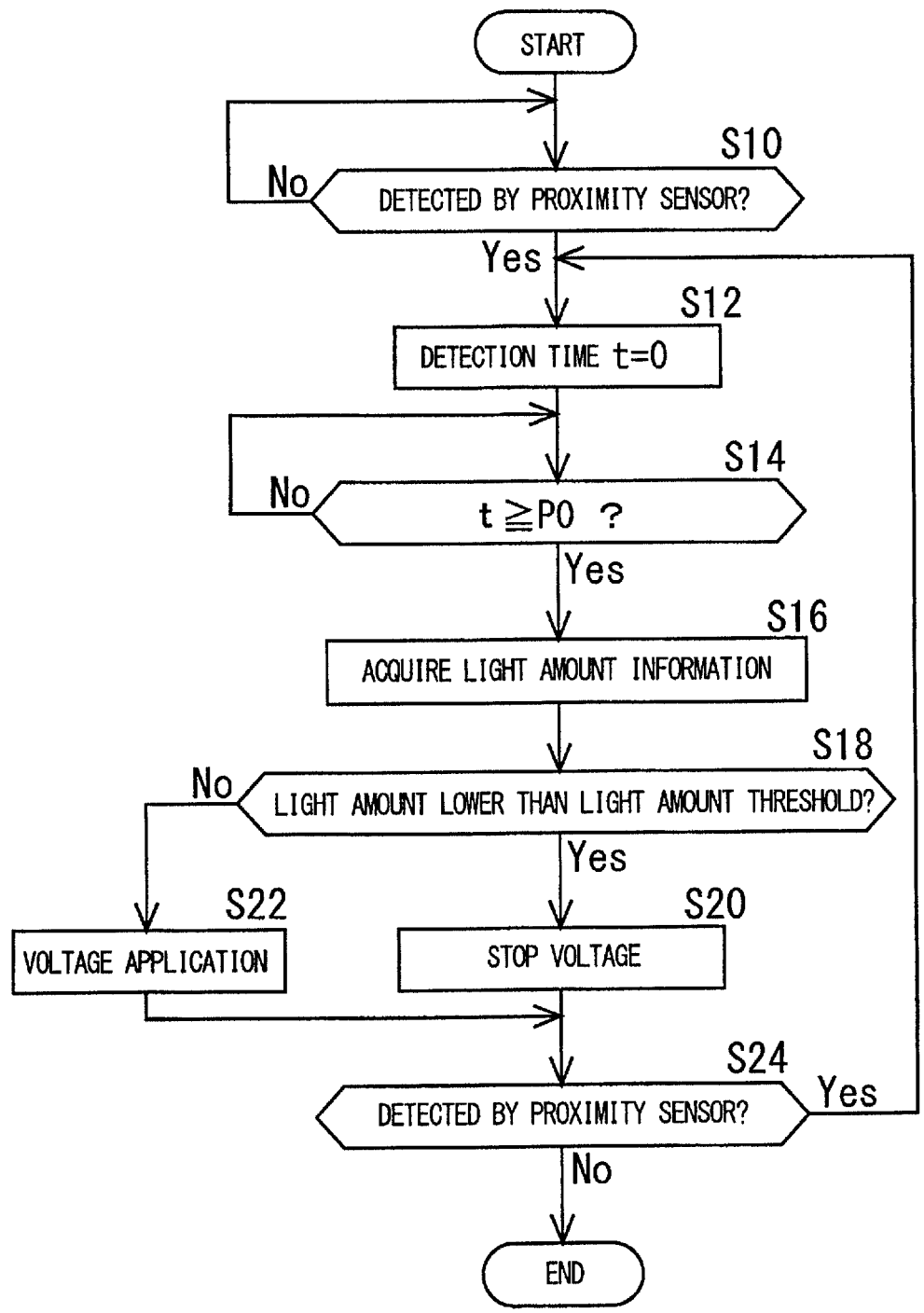
FIG. 27 is a flowchart of transmittance control processing performed by the optical device 10.

FIG. 27 is a flowchart of transmittance control processing performed by the optical device 10.

As shown in FIG. 27, in the transmittance control processing, the main control unit 54 judges whether the proximity sensor 18 has detected a user (S10). The main control unit 54 is in a standby state until judging that the proximity sensor 18 has detected a user (S10: No). When a user wears the optical device 10, the proximity sensor 18 detects the user, and outputs a presence signal to the main control unit 54. Then, the main control unit 54 judges that the proximity sensor 18 has detected a user (S10: Yes).

Next, the main control unit 54 resets, to "0", detection time t for judging necessity or unnecessity for detecting the light amount (S12). The main control unit 54 judges whether the detection time t has become a detection cycle P0, at which the light amount is detected, or longer (S14). The main control unit 54 is in a standby state until the detection time t becomes equal to or longer than the detection cycle P0 (S14: No). Upon judging that the detection time t has become equal to or longer than the detection cycle P0 (S14: Yes), the main control unit 54 acquires information about the light amount from the frontal light-amount detection unit 20 (S16).

The main control unit 54 judges whether the light amount detected by the frontal light-amount detection unit 20 is equal to or higher than the light amount threshold Th0 based on the acquired information about the light amount (S18).

Upon judging that the light amount is lower than the light amount threshold Th0 (S18: Yes), the main control unit 54 does not apply a voltage to the transmittance changing unit 16.

Note that when a voltage is being applied to the transmittance changing unit 16, the main control unit 54 stops application of the voltage (S20). Thereby, as shown in V=0 V in FIG. 5 and FIG. 12, the average transmittance of the transmittance changing unit 16 of the frontal direction and peripheral directions relative to the frontal direction become high. Also, in this state, the ratio of the peripheral transmittance relative to the frontal transmittance is high because the peripheral transmittance is high.

On the other hand, upon judging that the light amount is equal to or higher than the light amount threshold Th0 (S18: No), the main control unit 54 applies a voltage to the transmittance changing unit 16 via the liquid crystal drive unit 52 (S22). Here, as mentioned above, the main control unit 54 applies the voltage by switching between a high voltage and a low voltage cyclically at a predetermined duty ratio of a high voltage. For example, the main control unit 54 applies a voltage so that the time-averaged average voltage is 2 V.

Thereby, as shown in V=2.0 V in FIG. 6 and FIG. 12, the frontal transmittance and the peripheral transmittance of the transmittance changing unit 16 become low as compared with a state where a voltage is not being applied. As a result of this, the average transmittance of the transmittance changing unit 16 of the frontal direction and peripheral directions relative to the frontal direction becomes low as compared with a case where the light amount is lower than the light amount threshold Th0. Also, because the peripheral transmittance becomes low while the frontal transmittance changes little, the ratio of the peripheral transmittance relative to the frontal transmittance of the transmittance changing unit 16 becomes low as compared with a state where a voltage is not being applied.

Thereafter, upon acquiring the presence signal from the proximity sensor 18 and judging that the proximity sensor 18 has detected a user (S24: Yes), the main control unit 54 repeats Step S12 and the following steps. On the other hand, when not having acquired a presence signal from the proximity sensor 18, the main control unit 54 judges that the proximity sensor 18 has not detected a user (S24: No), and ends the transmittance control processing.

As mentioned above, in the optical device 10, the main control unit 54 controls the voltage to be applied to the transmittance changing unit 16 so that the relationship between the frontal transmittance and the peripheral transmittance varies. Thereby, the optical device 10 can cope with cases of different amounts of light from different directions, for example, a case where the obliquely upper light amount is higher than the frontal light amount, a case where the central and upper light amounts are the approximately same, and other cases.

Particularly, in the optical device 10, when the obliquely upper light amount is high, the main control unit 54 applies a voltage so that the average transmittance lowers and the upper peripheral transmittance becomes lower than the frontal transmittance. Thereby, for example, even when the sun is present obliquely above, the optical device 10 can block light appropriately.

Because in the optical device 10, the entrance-side orientation film 36 and the exit-side orientation film 40 have the rubbing directions shown in FIG. 2, due to application of a voltage, the peripheral transmittance of the transmittance changing unit 16 becomes lower from an upper portion while approximately maintaining the frontal transmittance. Accordingly, the aforementioned effect can be achieved easily.

In the optical device 10, the main control unit 54 applies the voltage to the transmittance changing unit 16 by switching between a high voltage and a low voltage at a cycle that is shorter than time required for the liquid crystal member 38 to stabilize. Thereby, the optical device 10 can make the transmittance of the transmittance changing unit 16 swing in a partial area between the maximum value and the minimum value. Thereby, because the user sees the outside while the light amount swings between constant values, the optical device 10 can lessen the degree of flicker.

In the optical device 10, the main control unit 54 switches between a high voltage and a low voltage at a cycle that is considerably shorter than the blinking cycle of a traffic light or the like. Thereby, the optical device 10 can suppress continuation of time during which almost no light reaches the eyes of the user. As a result of this, the optical device 10 can more suppress flicker.

Next, an embodiment obtained by partially modifying the aforementioned embodiment is explained.

Figure 28:
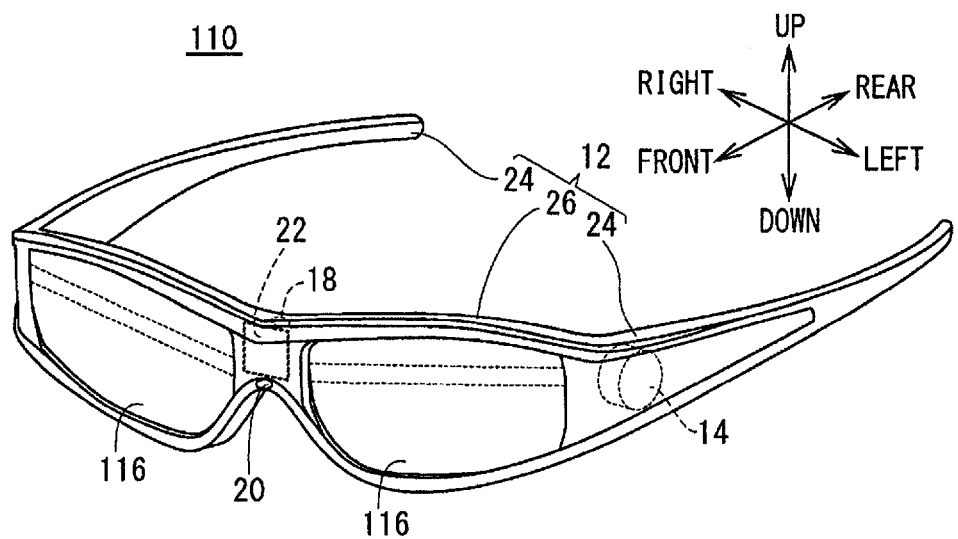
FIG. 28 is an overall configuration diagram of an optical device 110 obtained by modifying the entrance-side transparent electrode.
Figure 29:
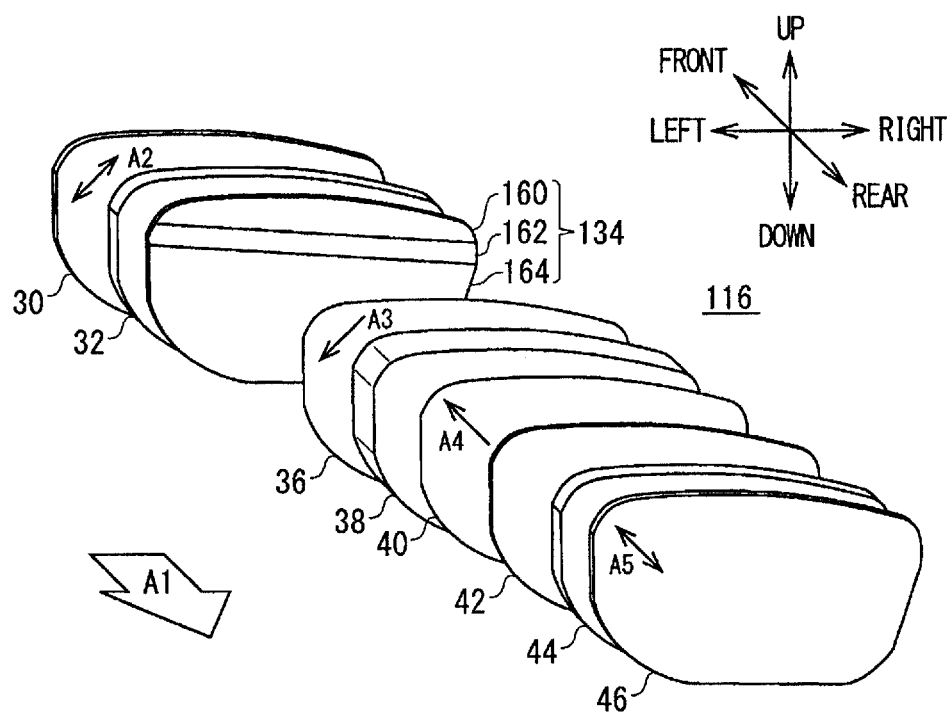
FIG. 29 is an exploded perspective view of a transmittance changing unit 116 of the optical device 110.

FIG. 28 is an overall configuration diagram of an optical device 110 obtained by modifying the entrance-side transparent electrode. FIG. 29 is an exploded perspective view of a transmittance changing unit 116 of the optical device 110. As shown in FIG. 28 and FIG. 29, the optical device 110 comprises the transmittance changing unit 116 having an entrance-side transparent electrode 134. The entrance-side transparent electrode 134 has three divided electrodes 160, 162, 164. The entrance-side transparent electrode 134 covers, with the three divided electrodes 160, 162, 164, the approximately entire exit-side surface of the entrance-side substrate 32. The divided electrodes 160, 162, 164 are arrayed along the vertical direction in this order. Clearances are formed between respective ones of the divided electrodes 160, 162, 164. One example of width of a clearance in the vertical direction is 15 µm. Thereby, the divided electrodes 160, 162, 164 are electrically insulated mutually. The divided electrodes 160, 162, 164 are patterned by etching.

Figure 30:
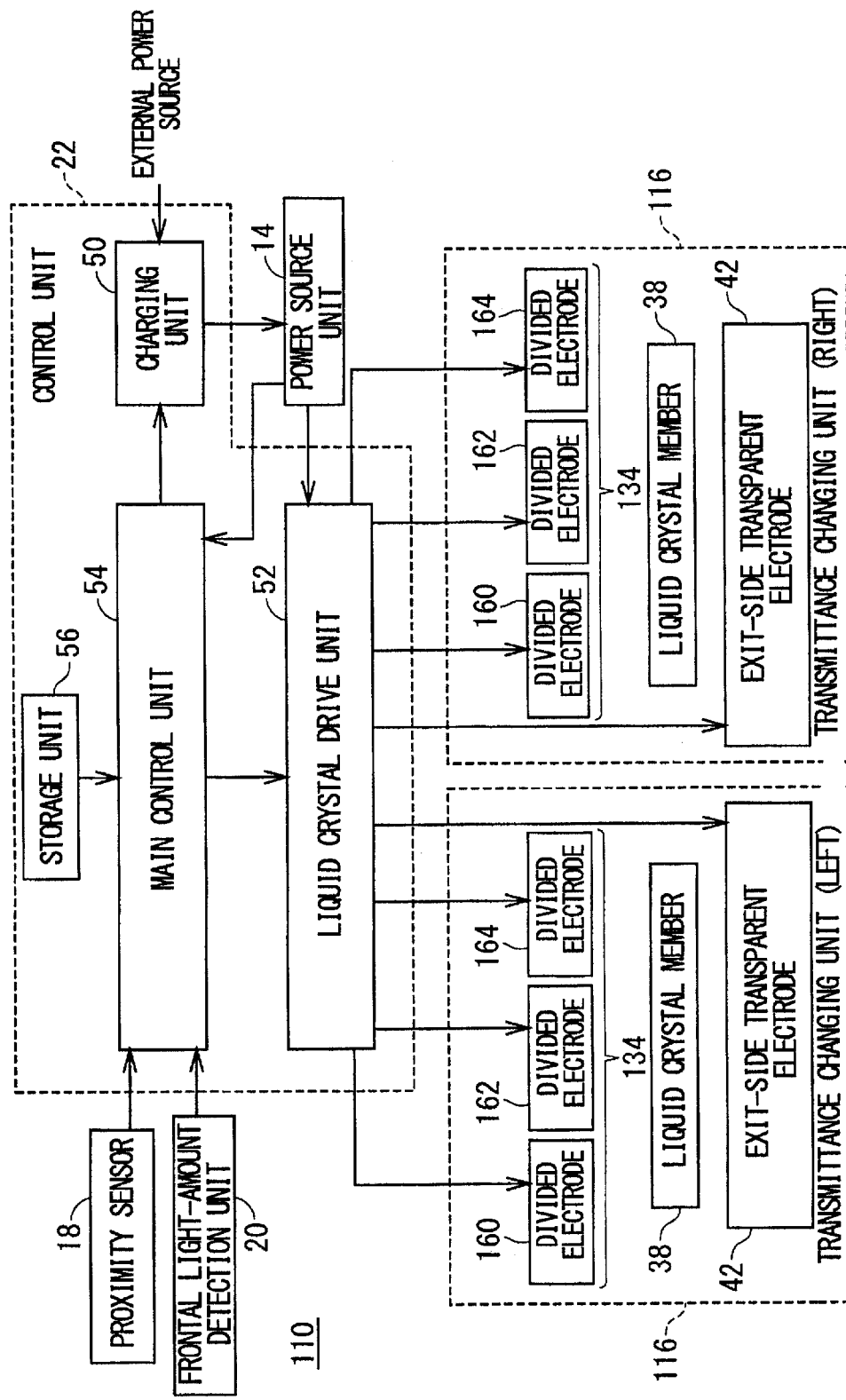
FIG. 30 is a block diagram of a control system of the optical device 110.

FIG. 30 is a block diagram of a control system of the optical device 110. As shown in FIG. 30, the main control unit 54 is connected with the divided electrodes 160, 162, 164 via the liquid crystal drive unit 52. The main control unit 54 acquires a voltage set that is a combination of voltages to be applied to the divided electrodes 160, 162, 164 from the storage unit 56. The main control unit 54 controls duty ratios of voltages of the divided electrodes 160, 162, 164 separately based on the acquired voltage set. For example, upon judging that the light amount is equal to or higher than the light amount threshold Th0, the main control unit 54 applies the voltage waveform VL1, the voltage waveform VL2, and the voltage waveform VL5 that are shown in FIG. 19 to the divided electrode 160, the divided electrode 162, and the divided electrode 164, respectively. On the other hand, upon judging that the light amount is lower than the light amount threshold Th0, the main control unit 54 does not apply a voltage to the divided electrodes 160, 162, 164. Thereby, the main control unit 54 can improve the relationship between the frontal transmittance and the peripheral transmittance, for example, the degree of freedom of a ratio between the frontal transmittance and the peripheral transmittance.

Although in each of the aforementioned embodiments, the transmittance of the transmittance changing unit is controlled by means of two voltages or two voltage sets, the transmittance at a plurality of levels may be controlled by means of a plurality of voltages or voltage sets shown in a voltage table.

Figures 31, 32:
FIG. 31 is a diagram showing a voltage table 66 in the optical device 10.
FIG. 32 is a diagram showing a voltage table 166 in the optical device 110.

FIG. 31 is a diagram showing a voltage table 66 in the optical device 10. The voltage table 66 is stored in the storage unit 56.

As shown in FIG. 31, light amounts and voltages are associated with each other in the voltage table 66. Accordingly, in the optical device 10, the main control unit 54 calculates a light amount LA detected by the frontal light-amount detection unit 20, and extracts, from the voltage table 66, 0 V or any of the voltage waveform VL1 to the voltage waveform VL5 associated with the light amount LA. Here, the light amount threshold Th0 to the light amount threshold Th 4 are in a relationship of Th0<Th1<Th2<Th3<Th4. The voltage waveform VL1 to the voltage waveform VL5 are as shown in FIG. 19. The main control unit 54 applies a voltage to the transmittance changing unit 16 at a predetermined duty ratio such that the averaged voltage becomes the extracted voltage. Thereby, the optical device 10 can control the transmittance of the transmittance changing unit 16 more appropriately according to the light amount LA.

For example, the main control unit 54 can control the transmittance of the transmittance changing unit 16 at six levels between 0 V to 2.5 V as shown in FIG. 12. In this case, a state with the transmittance at 0 V shown in FIG. 12 is one example of a first relationship, and a state with the transmittance at 2.5 V shown in FIG. 12 is one example of a second relationship. A state with the transmittance at 1.5 V shown in FIG. 12 is one example of a third relationship that is different from the first relationship and the second relationship. Here, the ratio of the peripheral transmittance relative to the frontal transmittance in the third relationship is equal to or lower than the ratio of the peripheral transmittance relative to the frontal transmittance in the first relationship, and is equal to or higher than the ratio of the peripheral transmittance relative to the frontal transmittance in the second relationship. Also, the frontal transmittance in the third relationship is equal to or lower than the frontal transmittance in the first relationship. The peripheral transmittance in the third relationship is equal to or lower than the peripheral transmittance in the first relationship, and is equal to or higher than the peripheral transmittance in the second relationship.

FIG. 32 is a diagram showing a voltage table 166 in the optical device 110. The voltage table 166 is stored in the storage unit 56. As shown in FIG. 32, the light amount LA and voltages to be applied to respective ones of the divided electrodes 160, 162, 164 are associated with each other in the voltage table 166. Accordingly, in the optical device 110, the main control unit 54 calculates the light amount LA detected by the frontal light-amount detection unit 20, and extracts, from the voltage table 166, voltages of the divided electrodes 160, 162, 164 associated with the light amount LA. The main control unit 54 applies a voltage to the transmittance changing unit 116 at a predetermined duty ratio so that the averaged voltage becomes the extracted voltage. Thereby, the optical device 110 can control the transmittance of the transmittance changing unit 116 more appropriately according to the light amount. Even when performing control based on FIG. 32, the main control unit

54 may control the transmittance changing unit 116 by using a relationship of the transmittance in the aforementioned first relationship, second relationship and third relationship.

Although in the aforementioned embodiments, the frontal light-amount detection unit 20 detects a light amount, an angle of incidence may be detected together with a light amount as shown below.

Figure 33:
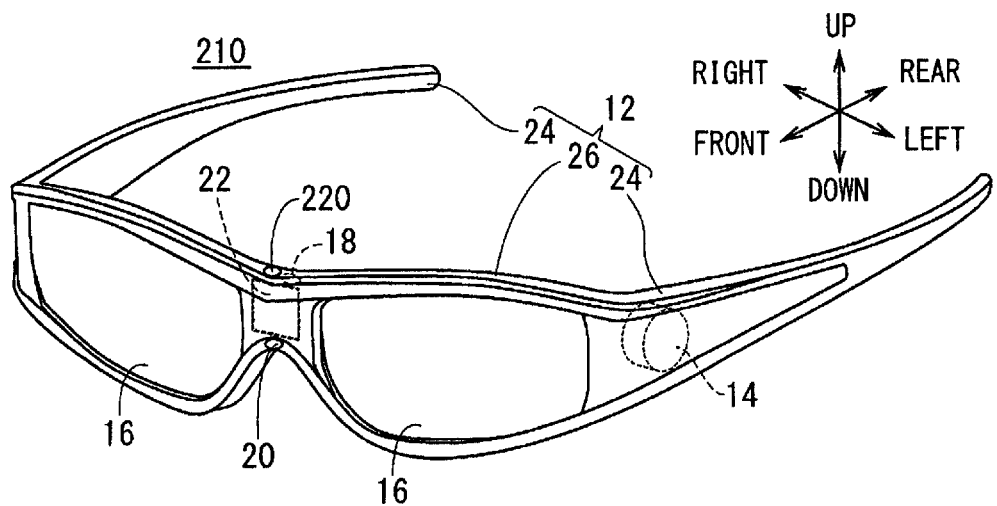
FIG. 33 is an overall configuration diagram of an optical device 210 that has two light-amount detection units.

FIG. 33 is an overall configuration diagram of an optical device 210 that has two light-amount detection units. As shown in FIG. 33, the optical device 210 further comprises an upper light-amount detection unit 220. The frontal light-amount detection unit 20 in the present embodiment is one example of a first light-amount detection unit and the upper light-amount detection unit 220 is one example of a second light-amount detection unit. The upper light-amount detection unit 220 is provided to face vertically upward. That is, the upper light-amount detection unit 220 faces more upward than the frontal light-amount detection unit 20 is. Note that the upper light-amount detection unit 220 may be oriented to incline forward from the vertically upward direction. The upper light-amount detection unit 220 is provided at a central portion on the top surface of the frame main body part 26. The upper light-amount detection unit 220 detects information about a light amount of light entering from the outside from an upward direction, and outputs the information to the main control unit 54.

The main control unit 54 acquires the information about the frontal light amount from the frontal light-amount detection unit 20, and acquires the information about the upper light amount from the upper light-amount detection unit 220. The main control unit 54 calculates the frontal light amount and the upper light amount, and calculates an angle of incidence of light from the outside relative to the horizontal direction. For example, the main control unit 54 calculates an angle of incidence based on a ratio between the frontal light amount and the upper light amount. Accordingly, the main control unit 54 calculates the angle inclined by 45° from the frontal direction to the vertically upward direction as the angle of incidence when the frontal light amount and the upper light amount are the same. The main control unit 54 decides the duty ratio of a voltage to be applied to the transmittance changing units 16, 116 according to the angle of incidence, and applies the voltage to the transmittance changing units 16, 116.

Specifically, upon judging that the absolute value of the angle of incidence of light is equal to or larger than an angle threshold, the main control unit 54 controls the voltage to be applied to the transmittance changing units 16, 116 such that the state of the transmittance shown in FIG. 5 is attained. On the other hand, upon judging that the absolute value of the angle of incidence of light is smaller than the angle threshold, the main control unit 54 controls the voltage to be applied to the transmittance changing units 16, 116 such that the state of the transmittance shown in FIG. 6 is attained. Note that the angle threshold is preset, and stored in the storage unit 56.

One example of the angle threshold is 20°.

Furthermore, the main control unit 54 may control the voltage based on a light amount or ambient brightness, and an angle of incidence. For example, the main control unit 54 identifies ambient brightness based on the average value of the frontal light amount and the upper light amount. Upon judging that the ambient brightness is lower than a brightness threshold, the main control unit 54 controls the voltage to be applied to the transmittance changing unit 16 such that the state of the transmittance shown in FIG. 5 or the state of the transmittance corresponding to 0 V in FIG. 12 is attained. Upon judging that the ambient brightness is equal to or higher than the brightness threshold, and furthermore the absolute value of the angle of incidence of light is smaller than the angle threshold, the main control unit 54 controls the voltage to be applied to the transmittance changing unit 16 such that the state of the transmittance shown in FIG. 6 or the state of the transmittance corresponding to 2.5 V in FIG. 12 is attained. Upon judging that the ambient brightness is equal to or higher than the brightness threshold, and furthermore the absolute value of the angle of incidence of light is equal to or larger than the angle threshold, the main control unit 54 controls the voltage to be applied to the transmittance changing unit 16 such that the state of the transmittance shown in FIG. 5 or the state of the transmittance corresponding to 0 V in FIG. 12 is attained. Note that upon judging that the ambient brightness is equal to or higher than the brightness threshold, and furthermore the absolute value of the angle of incidence of light is equal to or larger than the angle threshold, the main control unit 54 may control the voltage to be applied to the transmittance changing unit 16 such that the aforementioned third relationship, that is, the state of the transmittance corresponding to 1.5 V in FIG. 12 is attained. In other words, upon judging that the ambient brightness is equal to or higher than the brightness threshold, and furthermore the absolute value of the angle of incidence of light is equal to or larger than the angle threshold, the main control unit 54 may apply a voltage to the transmittance changing unit 16 at a duty ratio with a voltage that is higher than a voltage to be applied when the ambient brightness is judged to be lower than the brightness threshold and that is lower than a voltage to be applied when the ambient brightness is judged to be equal to or higher than the brightness threshold, and furthermore the absolute value of the angle of incidence of light is judged to be smaller than the angle threshold. The brightness threshold is preset, and stored in the storage unit 56.

One example of the brightness threshold is 3000 luxes. Also, the ambient brightness may be identified by the sum of the frontal light amount and the upper light amount.

Figure 34:
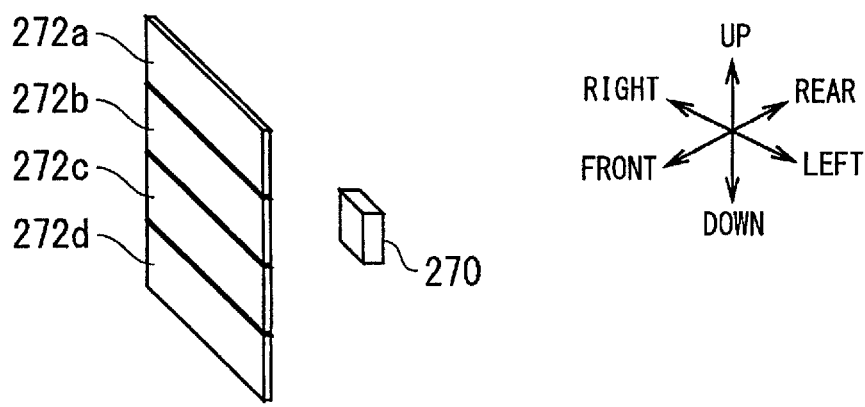
FIG. 34 is an overall perspective view of a frontal light-amount detection unit 270 and a plurality of divided transmission areas 272a, 272b, 272c, 272d.

FIG. 34 is an overall perspective view of a frontal light-amount detection unit 270 and a plurality of divided transmission areas 272a, 272b, 272c, 272d. The frontal light-amount detection unit 270 and the plurality of divided transmission areas 272a, 272b, 272c, 272d are placed at a central portion on the front surface of the frame main body part 26 of the optical device 10 in place of the frontal light-amount detection unit 20. When it is not necessary to identify any of the plurality of divided transmission areas 272a, 272b, 272c, 272d, they are explained as divided transmission areas 272. Note that the frontal light-amount detection unit 270 and the plurality of divided transmission areas 272 may be provided to the optical device 110.

As shown in FIG. 34, the frontal light-amount detection unit 270 is placed by being oriented to the frontal direction. One example of the direction of the frontal light-amount detection unit 270 is the directly frontal direction whose inclination relative to the horizontal direction and the vertical direction is 0°. The frontal light-amount detection unit 270 detects information about an amount of light that includes light from the frontal direction, and outputs the information to the main control unit 54.

The plurality of, for example four, divided transmission areas 272a, 272b, 272c, 272d are arrayed along the vertical direction. The four divided transmission areas 272a, 272b, 272c, 272d are placed so that they do not overlap each other in the front-rear direction. One surface of each of the divided transmission areas 272 is placed by being oriented to the frontal direction. The divided transmission areas 272 are placed in front of the frontal light-amount detection unit 270. The center of the four divided transmission areas 272 is placed in front of the center of the frontal light-amount detection unit 270. The divided transmission areas 272 are constituted with liquid crystal shutters that are electrically openable and closable. The divided transmission areas 272 have configuration whose transmittance can be controlled by opening and closing. Note that the transmittance may be switched between transmission and blocking, or may be switched between high transmittance and low transmittance. The main control unit 54 controls the transmittance of the four divided transmission areas 272 separately by means of an opening and closing instruction. When detecting a light amount, the main control unit 54 opens any one of the divided transmission areas 272, and closes the remaining ones of the divided transmission areas 272.

FIG. 35, FIG. 36, FIG. 37 and FIG. 38 are diagrams for explaining operation of the frontal light-amount detection unit 270 and the divided transmission areas 272 shown in FIG. 34. The main control unit 54 acquires information about a light amount from the frontal light-amount detection unit 270, and calculates the angle of incidence of light relative to the horizontal direction. A method of calculating the angle of incidence is explained by referring to FIG. 35, FIG. 36, FIG. 37 and FIG. 38.

Figure 35:
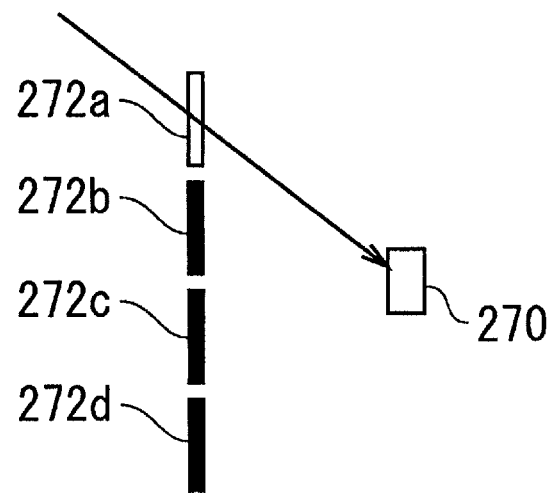
FIG. 35 is a diagram for explaining operation of the frontal light-amount detection unit 270 and the divided transmission areas 272 shown in FIG. 34.
Figure 36:
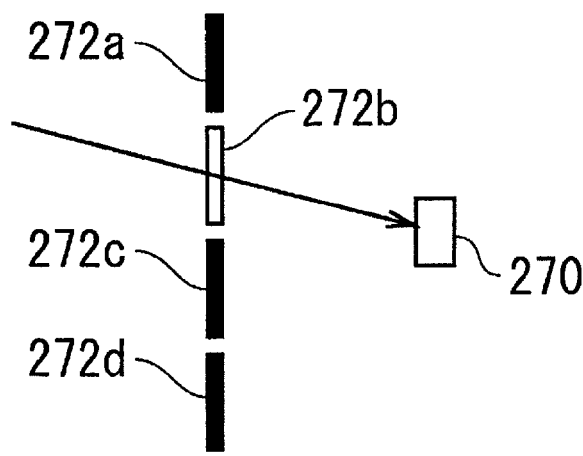
FIG. 36 is a diagram for explaining operation of the frontal light-amount detection unit 270 and the divided transmission areas 272 shown in FIG. 34.
Figure 37:
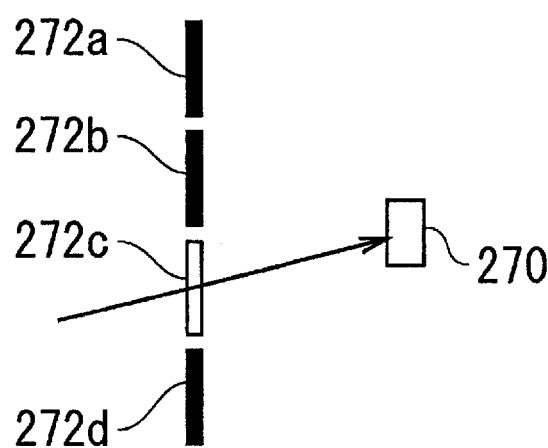
FIG. 37 is a diagram for explaining operation of the frontal light-amount detection unit 270 and the divided transmission areas 272 shown in FIG. 34.
Figure 38:
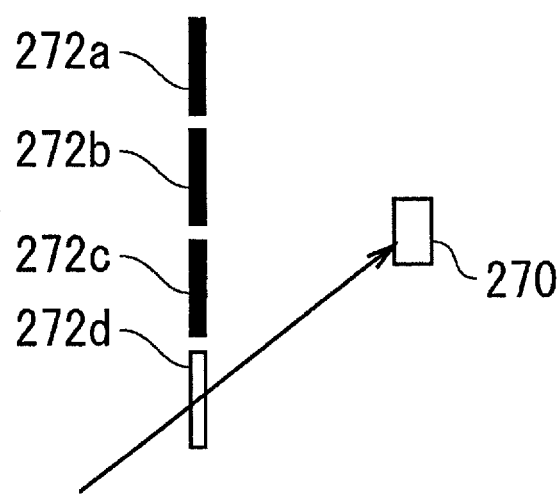
FIG. 38 is a diagram for explaining operation of the frontal light-amount detection unit 270 and the divided transmission areas 272 shown in FIG. 34.

In FIG. 35, the main control unit 54 controls the divided transmission area 272a so that it is in an open state, and controls the other divided transmission areas 272 so that they are in a closed state. In FIG. 36, the main control unit 54 controls the divided transmission area 272b so that it is in an open state, and controls the other divided transmission areas 272 so that they are in a closed state. In FIG. 37, the main control unit 54 controls the divided transmission area 272c so that it is in an open state, and controls the other divided transmission areas 272 so that they are in a closed state. In FIG. 38, the main control unit 54 controls the divided transmission area 272d so that it is in an open state, and controls the other divided transmission areas 272 so that they are in a closed state.

The main control unit 54 acquires information about a light amount from the frontal light-amount detection unit 270 while sequentially opening one of the four divided transmission areas 272. The main control unit 54 calculates a light amount based on the information about a light amount, and identifies a divided transmission area 272 in an open state when the highest light amount is detected. Thereby, the main control unit 54 identifies the angle of incidence of light from the outside. For example, upon judging that the light amount when the divided transmission area 272a is in an open state is the highest, the main control unit 54 identifies the angle inclined largely toward the upward direction from the frontal direction (for example, 45° or larger) as the angle of incidence of light. The main control unit 54 decides the duty ratio of the voltage to be applied to the transmittance changing unit 16 according to the angle of incidence, and applies the voltage to the transmittance changing unit 16.

Here, the main control unit 54 may control the voltage according to the angle of incidence as mentioned above, or may control the voltage according to the light amount and the angle of incidence. For example, upon judging that the light amount is lower than the light amount threshold, the main control unit 54 controls the voltage to be applied to the transmittance changing unit 16 such that the state of the transmittance shown in FIG. 5 or the state of the transmittance corresponding to 0 V in FIG. 12 is attained. Upon judging that the light amount is equal to or higher than the light amount threshold, and furthermore the absolute value of the angle of incidence of light is smaller than the angle threshold, the main control unit 54 controls the voltage to be applied to the transmittance changing unit 16 such that the state of the transmittance shown in FIG. 6 or the state of the transmittance corresponding to 2.5 V in FIG. 12 is attained. Upon judging that the light amount is equal to or higher than the light amount threshold, and furthermore the absolute value of the angle of incidence of light is equal to or larger than the angle threshold, the main control unit 54 controls the voltage to be applied to the transmittance changing unit 16 such that the state of the transmittance shown in FIG. 5 or the state of the transmittance corresponding to 0 V in FIG. 12 is attained. Note that upon judging that the ambient brightness is equal to or higher than the brightness threshold, and furthermore the absolute value of the angle of incidence of light is equal to or larger than the angle threshold, the main control unit 54 may control the voltage to be applied to the transmittance changing unit 16 such that the aforementioned third relationship, that is, the state of the transmittance corresponding to 1.5 V in FIG. 12 is attained.

Figure 39:
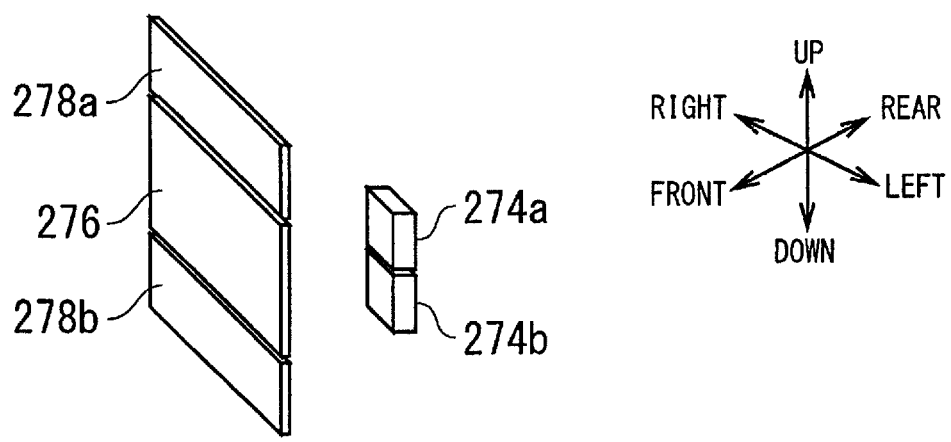
FIG. 39 is an overall perspective view of a plurality of frontal light-amount detection units 274a, 274b, a frontal transmission portion 276, and low transmission portions 278a, 278b.

FIG. 39 is an overall perspective view of a plurality of frontal light-amount detection units 274a, 274b, a frontal transmission portion 276, and low transmission portions 278a, 278b. The plurality of frontal light-amount detection units 274a, 274b, the frontal transmission portion 276, and the low transmission portions 278a, 278b are placed at a central portion on the front surface of the frame main body part 26 of the optical device 10 in place of the frontal light-amount detection unit 20. When it is not necessary to identify any of the plurality of frontal light-amount detection units 274a, 274b, they are explained as frontal light-amount detection units 274. When it is not necessary to identify any of the plurality of low transmission portions 278a, 278b, they are explained as low transmission portions 278. Note that the plurality of frontal light-amount detection units 274a, 274b, the frontal transmission portion 276, and the low transmission portions 278a, 278b may be provided to the optical device 110.

As shown in FIG. 39, the plurality of, for example two, frontal light-amount detection units 274 are placed by being oriented toward the frontal direction. One example of the direction of the frontal light-amount detection units 274 is the directly frontal direction whose inclination relative to the horizontal direction and the vertical direction is 0°. The frontal light-amount detection units 274 detect information about an amount of light that includes light from the frontal direction, and outputs the information to the main control unit 54. The information on the light amount detected by the frontal light-amount detection unit 274a is one example of information about a first frontal light amount. The information on the light amount detected by the frontal light-amount detection unit 274b is one example of information about a second frontal light amount. The frontal light-amount detection unit 274b is placed below the frontal light-amount detection unit 274a. The frontal light-amount detection unit 274a is one example of a first frontal light-amount detection unit, and the frontal light-amount detection unit 274b is one example of the second frontal light-amount detection unit.

The frontal transmission portion 276 is placed in front of the frontal light-amount detection units 274. The center of the frontal transmission portion 276 is placed in front of the center of the two frontal light-amount detection units 274a, 274b. One surface of the frontal transmission portion 276 is oriented toward the frontal direction. The frontal transmission portion 276 transmits light.

The low transmission portions 278a, 278b are placed above and below the frontal transmission portion 276. One of the low transmission portions 278a, 278b may be omitted. The low transmission portion 278 has light transmittance that is lower than that of the frontal transmission portion 276. Note that the low transmission portion 278 may block light.

FIG. 40, FIG. 41, FIG. 42 and FIG. 43 are diagrams for explaining operation of the frontal light-amount detection units 274 shown in FIG. 39. The main control unit 54 acquires information about a light amount from the frontal light-amount detection units 274a, 274b, and calculates the angle of incidence of light relative to the horizontal direction. A method of calculating the angle of incidence is explained by referring to FIG. 40, FIG. 41, FIG. 42 and FIG. 43.

Figure 40:
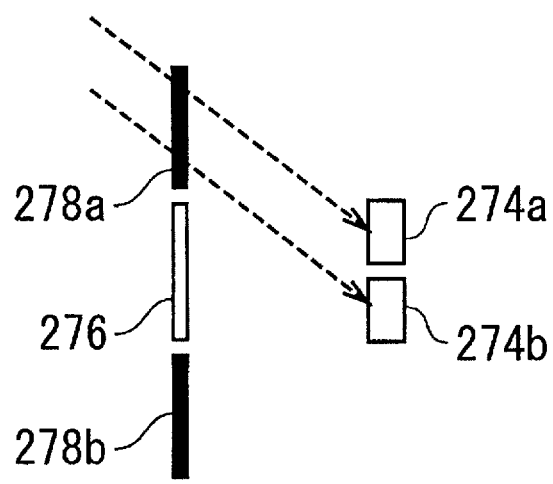
FIG. 40 is a diagram for explaining operation of the frontal light-amount detection units 274 shown in FIG. 39.

In FIG. 40, light from the outside enters from a direction inclined from the frontal direction to the upward direction. In this case, both the frontal light-amount detection units 274a, 274b receive light that is attenuated by the low transmission portion 278a.

Figure 41:
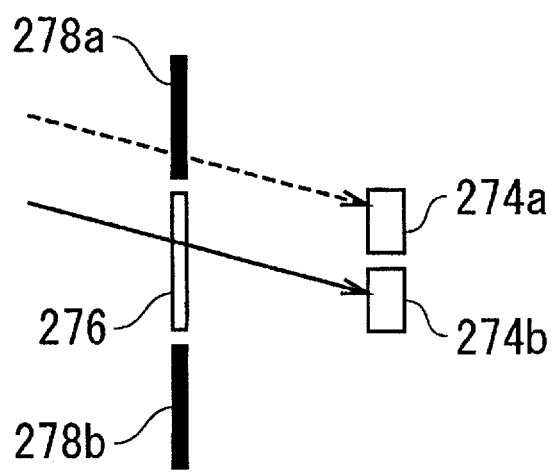
FIG. 41 is a diagram for explaining operation of the frontal light-amount detection units 274 shown in FIG. 39.

In FIG. 41, light whose inclination angle toward the upward is smaller than that in FIG. 40 is entering. In this case, the frontal light-amount detection unit 274a receives light attenuated by the low transmission portion 278a, but the frontal light-amount detection unit 274b receives light that has been transmitted by the frontal transmission portion 276. Accordingly, the amount of light received by the frontal light-amount detection unit 274b is higher than the amount of light received by the frontal light-amount detection unit 274a.

Figure 42:
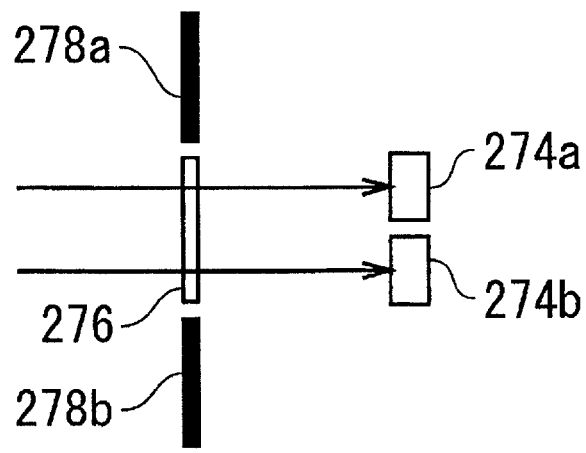
FIG. 42 is a diagram for explaining operation of the frontal light-amount detection units 274 shown in FIG. 39.

In FIG. 42, light from the outside enters at an inclination angle of approximately 0° relative to the frontal direction. In this case, both the frontal light-amount detection units 274a, 274b receive light that has been transmitted by the frontal transmission portion 276. Accordingly, the amounts of light received by the frontal light-amount detection units 274a, 274b are higher than those in the state of FIG. 40.

Figure 43:
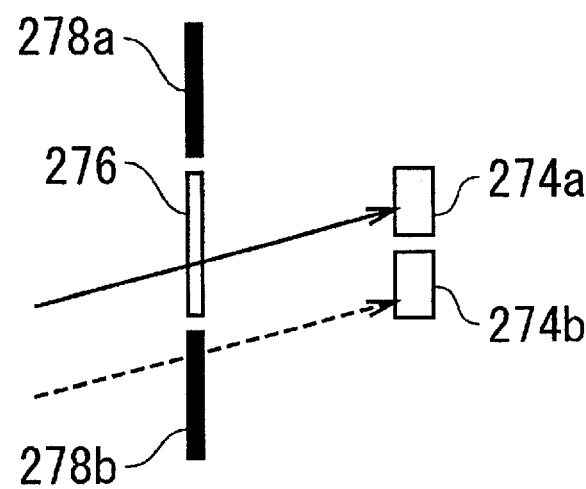
FIG. 43 is a diagram for explaining operation of the frontal light-amount detection units 274 shown in FIG. 39.

In FIG. 43, light from the outside enters from a direction inclined vertically downward. In this case, the frontal light-amount detection unit 274a receives light that has been transmitted by the frontal transmission portion 276, and the frontal light-amount detection unit 274b receives light that has been transmitted by the low transmission portion 278b. Accordingly, the amount of light received by the frontal light-amount detection unit 274a is higher than the amount of light received by the frontal light-amount detection unit 274b.

The main control unit 54 acquires information about light amounts from the frontal light-amount detection units 274a, 274b, and calculates the respective light amounts. The main control unit 54 calculates the angle of incidence of light from the outside based on the two calculated light amounts, and the relationship between the two light amounts. The main control unit 54 decides the duty ratio of the voltage to be applied to the transmittance changing unit 16 according to the angle of incidence, and applies the voltage to the transmittance changing unit 16.

Also, the main control unit 54 may identify the ambient brightness based on the average value of light amounts calculated based on the information about the two frontal light amounts. Upon judging that the ambient brightness is lower than the brightness threshold, the main control unit 54 controls the voltage to be applied to the transmittance changing unit 16 such that the state of the transmittance shown in FIG. 5 or the state of the transmittance corresponding to 0 V in FIG. 12 is attained. Upon judging that the ambient brightness is equal to or higher than the brightness threshold, and furthermore the absolute value of the angle of incidence of light is smaller than the angle threshold, the main control unit 54 controls the voltage to be applied to the transmittance changing unit 16 such that the state of the transmittance shown in FIG. 6 or the state of the transmittance corresponding to 2.5 V in FIG. 12 is attained. Upon judging that the ambient brightness is equal to or higher than the brightness threshold, and furthermore the absolute value of the angle of incidence of light is equal to or larger than the angle threshold, the main control unit 54 controls the voltage to be applied to the transmittance changing unit 16 such that the state of the transmittance shown in FIG. 5 or the state of the transmittance corresponding to 0 V in FIG. 12 is attained. Note that upon judging that the ambient brightness is equal to or higher than the brightness threshold, and furthermore the absolute value of the angle of incidence of light is equal to or larger than the angle threshold, the main control unit 54 may control the voltage to be applied to the transmittance changing unit 16 such that the aforementioned third relationship, that is, the state of the transmittance corresponding to 1.5 V in FIG. 12 is attained. The brightness threshold is similar to the aforementioned brightness threshold.

Although in the aforementioned embodiment of calculating the angle of incidence, the number of the angle threshold is one as an example, a plurality of angle thresholds may be used. For example, a plurality of angle thresholds are a first angle threshold that is the same with the aforementioned angle threshold, and a second angle threshold lower than the first angle threshold. Upon judging that the absolute value of the angle of incidence is smaller than the second angle threshold, the main control unit 54 controls the voltage to attain a relationship between the frontal transmittance and the peripheral transmittance that makes an angle of the peripheral transmittance or lower wide as shown in FIG. 6. Specifically, in the optical device 10, upon judging that the absolute value of the angle of incidence is equal to or larger than the first angle threshold, the main control unit 54 performs control such that the state corresponding to 0 V in FIG. 12 is attained. Upon judging that the absolute value of the angle of incidence is smaller than the first angle threshold, and is equal to or larger than the second angle threshold, the main control unit 54 performs control such that the state corresponding to 1 V in FIG. 12 is attained. Upon judging that the angle of incidence is smaller than the second angle threshold, the main control unit 54 performs control such that the state corresponding to 2 V in FIG. 12 is attained. The states corresponding to 0 V, 1 V, and 2V in FIG. 12 are one example of a first relationship, a second relationship, and a fourth relationship.

On the other hand, in the optical device 110, upon judging that the absolute value of the angle of incidence is equal to or larger than the first angle threshold, the main control unit 54 applies a voltage similar to "LA<Th0" shown in FIG. 32 to the divided electrodes 160, 162, 164. Upon judging that the absolute value of the angle of incidence is smaller than the first angle threshold, and is equal to or larger than the second angle threshold, the main control unit 54 applies a voltage similar to "Th1≤LA<Th2" shown in FIG. 32 to the divided electrodes 160, 162, 164. Upon judging that the angle of incidence is smaller than the second angle threshold, the main control unit 54 applies a voltage similar to "Th3≤LA<Th4" shown in FIG. 32 to the divided electrodes 160, 162, 164. In other words, upon judging that the absolute value of the angle of incidence is lower than the first angle threshold, and is equal to or larger than the second angle threshold, the main control unit 54 applies voltages to the divided electrodes 160, 162, 164 at duty ratios with a voltage that is equal to or higher than a voltage when the absolute value of the angle of incidence is judged to be equal to or larger than the first angle threshold and that is equal to or lower than a voltage when the angle of incidence is judged to be lower than the second angle threshold.

The states of the transmittance changing unit 116 to which voltages shown in "LA<Th0", "Th1≤LA<Th2", "Th3≤LA<Th4" in FIG. 32 are applied are one example of a first relationship, a second relationship, and a fourth relationship.

Figure 44:
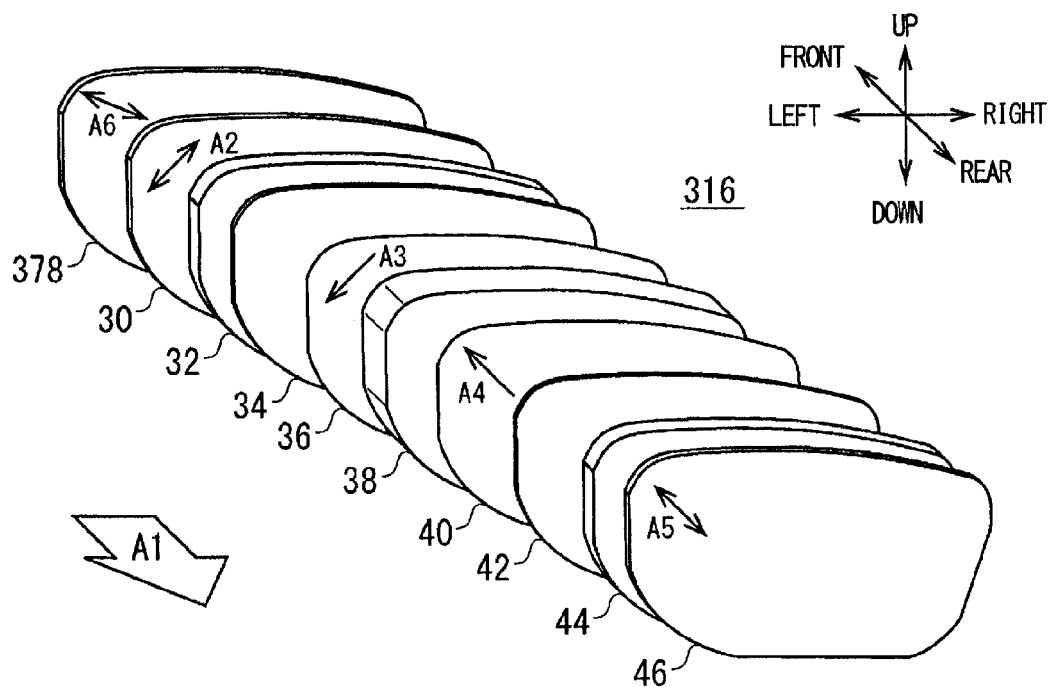
FIG. 44 is an exploded perspective view of a transmittance changing unit 316 provided with a λ/2 phase plate 378.

FIG. 44 is an exploded perspective view of a transmittance changing unit 316 provided with a λ/2 phase plate 378.

As shown in FIG. 44, the transmittance changing unit 316 has a λ/2 phase plate 378. The λ/2 phase plate 378 is provided on the entrance-side surface of the entrance-side polarizing plate 30. In other words, the λ/2 phase plate 378 is provided farthest on the entrance side in the transmittance changing unit 316. As indicated with an arrow A6, the λ/2 phase plate 378 has a slow axis in a direction inclined by 67.5° counterclockwise relative to the vertical direction as seen from the exit side.

In the transmittance changing unit 316, upon entrance of linearly polarized light that has a polarization direction parallel with the horizontal direction, the λ/2 phase plate 378 modulates the polarization direction of the linearly polarized light to a direction symmetric to the slow axis of itself. Accordingly, the λ/2 phase plate 378 outputs light as linearly polarized light whose polarization direction is a direction rotated by 45° clockwise from the horizontal direction as seen from the exit side. Because this linearly polarized light has a polarization direction orthogonal to the transmission axis of the entrance-side polarizing plate 30, it is absorbed by the entrance-side polarizing plate 30.

Here, non-polarized light such as sunlight becomes linearly polarized light whose polarization direction is the horizontal direction after being reflected on an approximately horizontal surface such as a water surface. Accordingly, the transmittance changing unit 316 can reduce glare due to light reflected from the water surface or the like when a user sees the water surface. Note that when non-polarized light such as sunlight enters the transmittance changing unit 316 without being reflected on a water surface or the like, components of the light other than an horizontal amplitude component are transmitted by the transmittance changing unit 316 as in the aforementioned manner.

Figure 45:
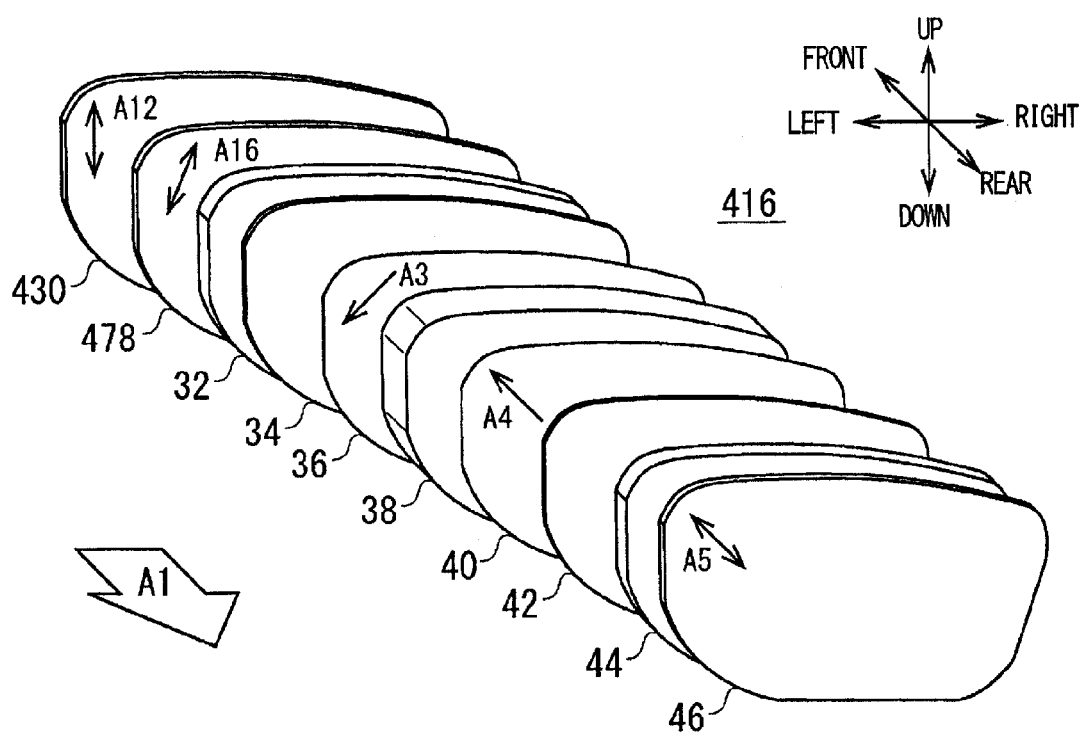
FIG. 45 is an exploded perspective view of a transmittance changing unit 416 provided with a λ/2 phase plate 478.

FIG. 45 is an exploded perspective view of a transmittance changing unit 416 provided with a λ/2 phase plate 478.

As shown in FIG. 45, in the transmittance changing unit 16, the transmittance changing unit 416 has an entrance-side polarizing plate 430 and a λ/2 phase plate 478 in place of the entrance-side polarizing plate 30. The entrance-side polarizing plate 430 is provided farthest on the entrance side of the transmittance changing unit 416. As indicated with an arrow A12, the entrance-side polarizing plate 430 has a transmission axis parallel with the vertical direction. The λ/2 phase plate 478 is provided on the exit side of the entrance-side polarizing plate 430. As indicated with an arrow A16, the λ/2 phase plate 478 has a slow axis in a direction inclined by 22.5° clockwise from the vertical direction as seen from the exit side. As mentioned above, the exit-side polarizing plate 46 has a transmission axis inclined by 45° counterclockwise from the vertical direction. In other words, the exit-side polarizing plate 46 has a transmission axis inclined by 45° from the transmission axis of the entrance-side polarizing plate 430 in a direction that is opposite to the inclination of the slow axis of the λ/2 phase plate 478.

In the transmittance changing unit 416, the entrance-side polarizing plate 430 absorbs linearly polarized light that has been reflected on a water surface or the like and whose polarization direction is the horizontal direction. As a result of this, the transmittance changing unit 416 can reduce glare due to light reflected from the water surface or the like when a user sees the water surface. Also, the entrance-side polarizing plate 430 outputs linearly polarized light whose polarization direction is the vertical direction. This linearly polarized light is modulated into linearly polarized light whose polarization direction is a direction rotated by 45° clockwise from the vertical direction by the λ/2 phase plate 478. The linearly polarized light is transmitted by the transmittance changing unit 416 as mentioned above.

Figure 46:
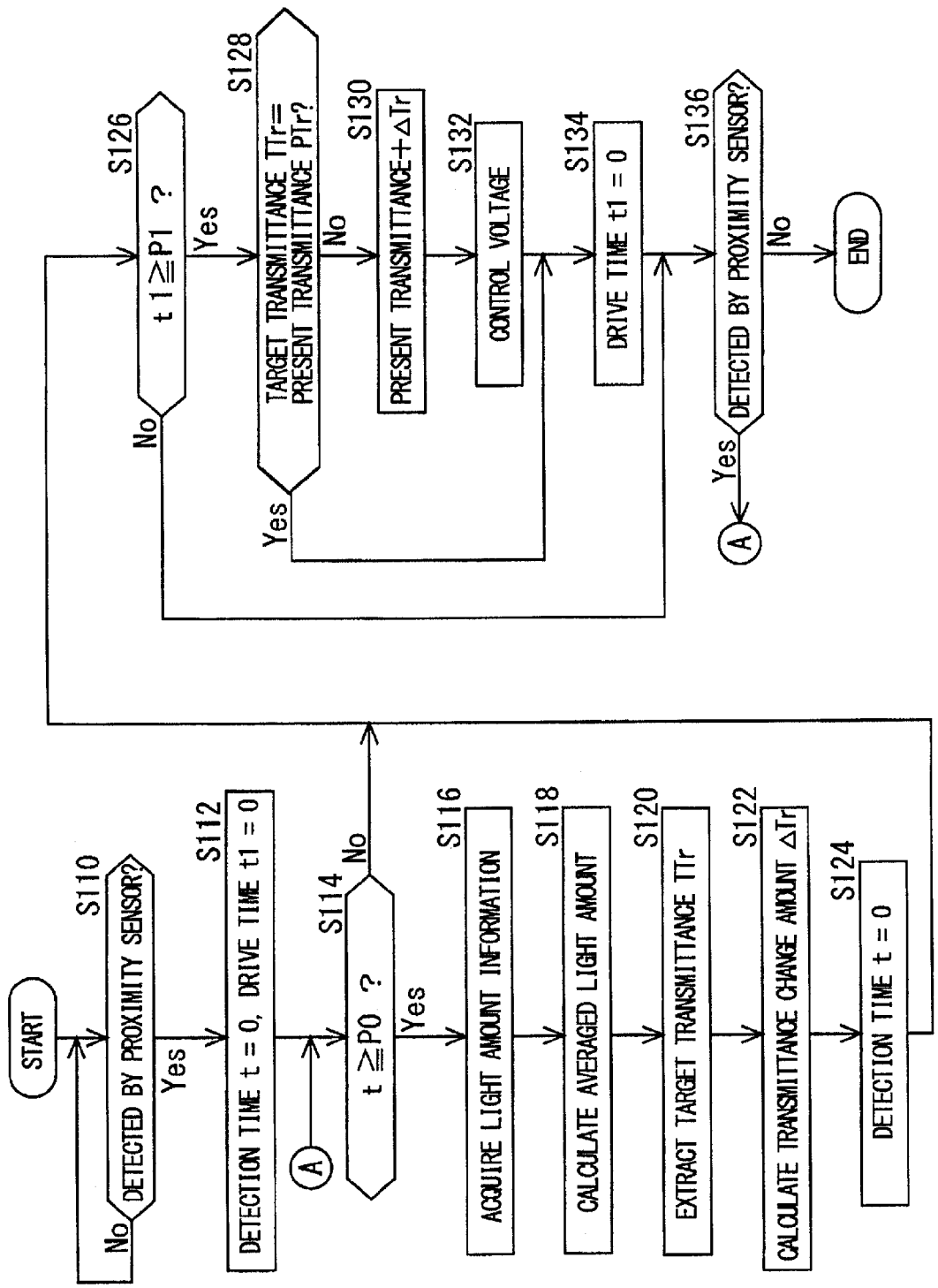
FIG. 46 is a flowchart of modified transmittance control processing.
Figure 47:
FIG. 47 is a diagram showing a target transmittance table 80.

Next, modified transmittance control processing is explained. FIG. 46 is a flowchart of the modified transmittance control processing changed. FIG. 47 is a diagram showing a target transmittance table 80. Note that although the transmittance control processing according to the present embodiment is explained as being executed by the optical device 10, it may be executed by the optical device 110 or the like.

As shown in FIG. 46, when the proximity sensor 18 detects a user (S110: Yes), the main control unit 54 sets the detection time t, the drive time t1 to "0" (S112). Next, it is judged whether the detection time t is equal to or longer than the detection cycle P0 that is one example of a first cycle (S114). Upon judging that the detection time t is not equal to or longer than the detection cycle P0 (S114: No), the main control unit 54 performs processing of Step S126 described below.

On the other hand, upon judging that the detection time t is equal to or longer than the detection cycle P0 (S114: Yes), the main control unit 54 acquires information about a light amount from the frontal light-amount detection unit 20 (S116). The main control unit 54 calculates a light amount based on the acquire information about a light amount, and calculates an averaged light amount AL that is the weighted moving average of light amounts based on the following equation (S118). Note that the averaged light amount may be obtained by simple moving averaging or exponential moving averaging.

$$AL = \frac{\sum_{0}^{n-1} (n-m) \times L_m}{\sum_{1}^{n} m} = \frac{n \times L_0 + (n-1) \times L_1 + (n-2) \times L_2 + \ldots + 1 \times L_{n-1}}{n + (n-1) + (n-2) + \ldots + 1}$$

[Equation 1]

$L_m$: Light amount detected $m$ times before (when $m = 0$, presently detected light amount)

$n$: Number of times of light amount detection for averaging

One example of the number of times of detection n in the above-described equation is ten. Next, the main control unit 54 extracts, from the target transmittance table 80 stored in the storage unit 56, a the target transmittance TTr that corresponds to the calculated averaged light amount AL (S120). As shown in FIG. 47, averaged light amounts ALp (p=1, 2, . . . ) and target transmittance TTrp are associated with each other in the target transmittance table 80. Note that each averaged light amount ALp is a numerical range of a light amount that has predetermined range. The relationships between the frontal transmittance and the peripheral transmittance at respective target transmittance are different from each other.

Next, the main control unit 54 calculates a transmittance change amount ΔTr per unit time (S122). The transmittance change amount ΔTr is calculated by the following equation. Note that q is a predetermined set number. A higher q leads to a smaller transmittance change amount ΔTr, and can make changes in transmittance smooth.

$$\Delta Tr = (TTr - PTr)/q$$

The main control unit 54 sets the detection time t to "0" (S124). The main control unit 54 judges whether the drive time t1 is equal to or longer than the drive cycle P1 that is one example of a second cycle (S126). The drive cycle P1 is shorter than the detection cycle P0. Upon judging that the drive time t1 is not equal to or longer than the drive cycle P1 (S126: No), the main control unit 54 performs processing of Step S136 described below.

On the other hand, upon judging that the drive time t1 is equal to or longer than the drive cycle P1 (S126: Yes), the main control unit 54 judges whether the target transmittance TTr and the present transmittance PTr that is present transmittance are equal to each other, and judges necessity or unnecessity for switching of the transmittance (S128). In other words, the main control unit 54 calculates the averaged light amount at the drive cycle P1 that is shorter than the detection cycle P0, and judges necessity or unnecessity for switching of the relationship between the frontal transmittance and the peripheral transmittance of the transmittance changing unit 16. Note that the main control unit 54 identifies the present transmittance PTr based on the duty ratio of the voltage currently being applied. Upon judging that the target transmittance TTr is equal to the present transmittance PTr (S128: Yes), the main control unit 54 performs processing of Step S134 described below.

Upon judging that the target transmittance TTr and the present transmittance PTr are different from each other (S128: No), the main control unit 54 calculates the sum of the present transmittance PTr and the transmittance change amount ΔTr (S130). The main control unit 54 changes the duty ratio of the voltage such that the transmittance of the transmittance changing unit 16 becomes the sum of the present transmittance PTr and the transmittance change amount ΔTr, and applies the voltage to the transmittance changing unit 16 to switch the transmittance (S132). Thereby, the relationship between the frontal transmittance and the peripheral transmittance of the transmittance changing unit 16 is switched to a different relationship. Next, the main control unit 54 sets the drive time t1 to "0" (S134). Thereafter, the main control unit 54 repeats Step S114 and the following steps while a user is being detected by the proximity sensor 18 (S136: Yes).

As mentioned above, in the transmittance control processing of the flowchart shown in FIG. 46, the drive cycle P1 that is a cycle of changing the voltage to be applied to the transmittance changing unit 16 is shorter than the detection cycle P0 of detecting the light amount. Thereby, changes in the transmittance can be made smooth.

Figure 48:
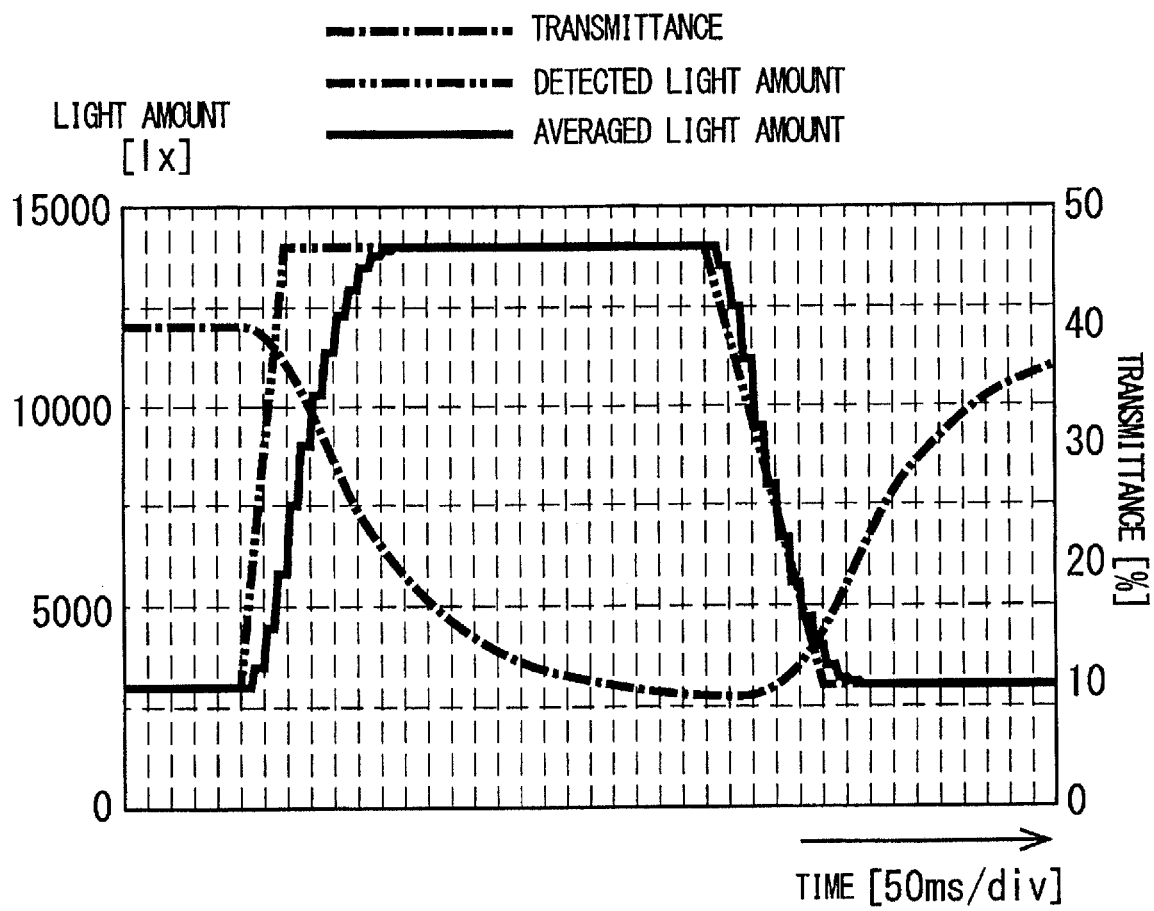
FIG. 48 is a graph of an experimental result obtained by measuring temporal changes in the transmittance, averaged light amount and detected light amount.

FIG. 48 is a graph of an experimental result obtained by measuring temporal changes in the transmittance, averaged light amount and detected light amount. The graph shown in FIG. 48 is a result obtained by executing the flowchart shown in FIG. 46 under the following conditions. The length of intervals of the horizontal axis shown in FIG. 48 corresponds to ½ of the cycle of calculating the averaged light amount.

(1) the maximum value of detected light amounts: 14000 luxes (2) the minimum value of detected light amounts: 3000 luxes (3) changes in light amounts: 11000 luxes/200 ms (4) the maximum value of the transmittance of the transmittance changing unit 16: 40%

(5) the minimum value of the transmittance of the transmittance changing unit 16: 9%

(6) the detection cycle of the frontal light-amount detection unit 20: 50 ms (7) number of times of detection m of the averaged light amount: 10

(8) q in calculating the transmittance change amount ΔTr: 30

The maximum value of 14000 luxes of the light amounts (=illuminance) shown in FIG. 48 is generally equivalent to the light amount of places in the sun in the daytime, and the minimum value of 3000 luxes of the light amounts is generally equivalent to the light amount of shade in the daytime. The unit time of 200 ms of calculating changes in the light amount is about the same with the time of blinks of human eyes. In such environmental changes of the light amount, the transmittance of the transmittance changing unit 16 starts changing within 100 ms after the light amount starts changing, and about 1 s after, the transmittance becomes close to (present transmittance TTr+ΔTr). Thereafter, the optical device 10 changes the transmittance of the transmittance changing unit 16 slowly. In this experiment, the optical device 10 can reduce the uncomfortable feeling of a user by changing the transmittance of the transmittance changing unit 16 slowly, rather than by rapidly changing the transmittance in response to changes in the light amount. Also, the optical device 10 can realize a sufficient effect of a function of removing glare in response to rapid changes in the light amount.

Figure 49:
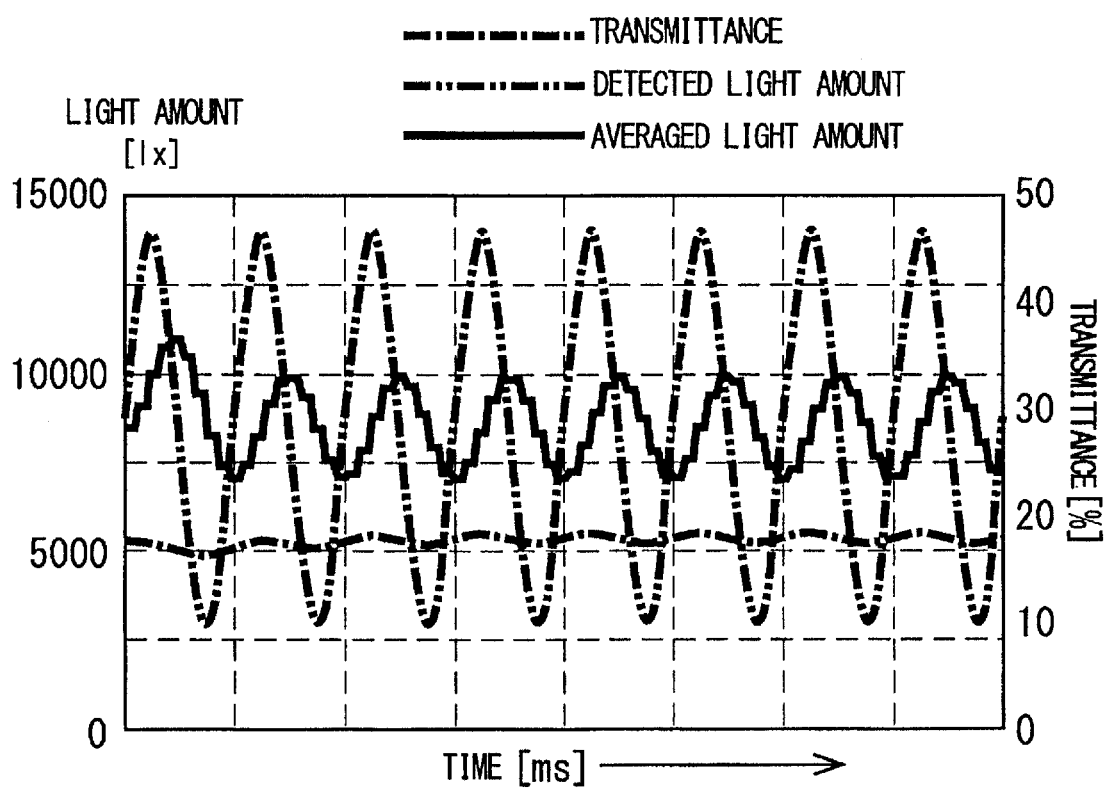
FIG. 49 is a graph of an experimental result obtained by measuring temporal changes in the transmittance, averaged light amount and detected light amount.

FIG. 49 is a graph of an experimental result obtained by measuring temporal changes in the transmittance, averaged light amount and detected light amount. The graph shown in FIG. 49 shows a result obtained by executing the flowchart shown in FIG. 46 under the same conditions as the conditions of FIG. 48, except that the light amount was changed such that the amplitude of 11000 was changed based on a sine wave of 2 Hz. As shown in FIG. 49, even when the light amount changes at a short cycle, the changes in the transmittance of the transmittance changing unit 16 can maintain an almost constant state. Thereby, the optical device 10 can reduce an annoyance a user may feel because of changes in transmittance due to changes in the light amount.

Figure 50:
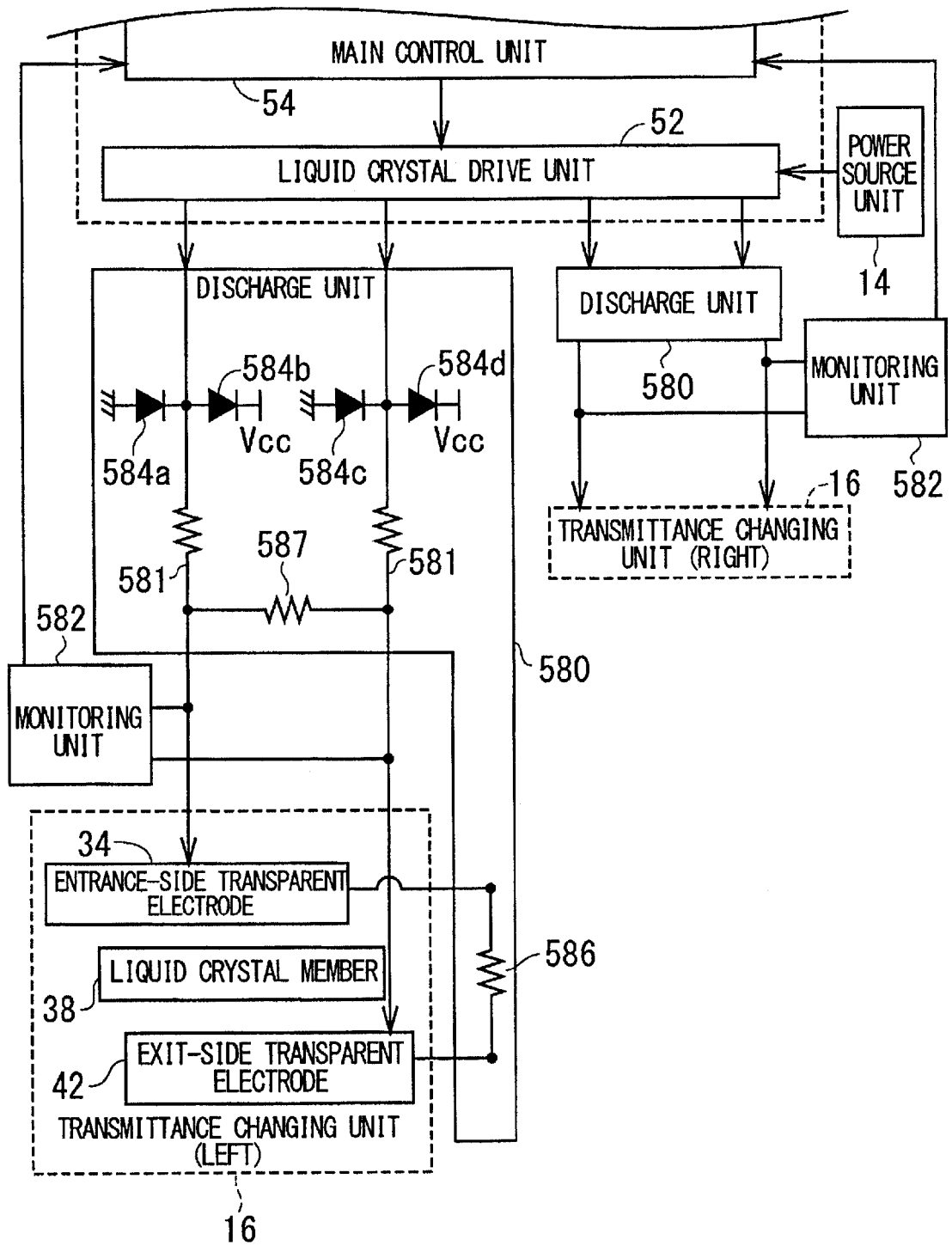
FIG. 50 is a block diagram of an optical device 510 provided with a discharge unit 580 and a monitoring unit 582.

FIG. 50 is a block diagram of an optical device 510 provided with a discharge unit 580 and a monitoring unit 582. In FIG. 50, configuration that is similar to that of the optical device 10 is partially omitted. Note that although the optical device 510 of FIG. 50 is explained as one that is obtained by modifying the optical device 10, the discharge unit 580 and the monitoring unit 582 may be applied to the optical device 110 or the like.

As shown in FIG. 50, the optical device 510 further comprises the discharge unit 580, a pair of connecting members 581, 581, and the monitoring unit 582.

The discharge unit 580 is placed at a middle portion of the pair of connecting members 581, 581 that connect the power source unit 14 and the transmittance changing unit 16 via the liquid crystal drive unit 52. The discharge unit 580 discharges electrical charges accumulated in the transmittance changing unit 16 when a voltage is not being applied thereto. The discharge unit 580 has two sets of a pair of rectifying members 584a, 584b and a pair of rectifying members 584c, 584d, and two discharge resistors 586, 587.

A semiconductor diode or the like may be applied as the rectifying members 584a, 584b, 584c, 584d. The anodes of the rectifying members 584a, 584c are grounded. The cathodes of the rectifying members 584b, 584d are connected to the power source unit 14. The cathode of the rectifying member 584a and the anode of the rectifying member 584b are connected to wiring that connects the liquid crystal drive unit 52 and the entrance-side transparent electrode 34. The cathode of the rectifying member 584c and the anode of the rectifying member 584d are connected to wiring that connects the liquid crystal drive unit 52 and the exit-side transparent electrode 42. Thereby, the rectifying members 584a, 584b are connected in series such that their rectification directions are the same. The rectifying members 584c, 584d are connected in series such that their rectification directions are the same. Also, a portion between the rectifying members 584a, 584b is connected to a middle portion of the connecting member 581. A portion between the rectifying members 584c, 584d are connected to a middle portion of the connecting member 581.

Thereby, when a portion between the liquid crystal drive unit 52 and the entrance-side transparent electrode 34 or the exit-side transparent electrode 42 is disconnected, the discharge unit 580 can discharge electrical charges accumulated the entrance-side transparent electrode 34 or the exit-side transparent electrode 42 via any of the two pairs of rectifying members 584a, 584b, 584c, 584d as long as the wiring between two the pairs of rectifying members 584a, 584b, 584c, 584d and the entrance-side transparent electrode 34 or the exit-side transparent electrode 42 is connected. For example, if the aforementioned disconnection occurs when negative electrical charges are accumulated in the entrance-side transparent electrode 34, the electrical charges flow through the rectifying member 584b, and are discharged to the power source unit 14. Thereby, even if disconnection occurs in a state where a voltage is applied between the entrance-side transparent electrode 34 and the exit-side transparent electrode 42, it is possible to resolve a state where a voltage is applied. As a result of this, the discharge unit 580 can suppress continuation of a state where the transmittance of the transmittance changing unit 16 is low.

One end of the discharge resistor 586 is directly connected to the entrance-side transparent electrode 34. The other end of the discharge resistor 586 is directly connected to the exit-side transparent electrode 42. In other words, the discharge resistor 586 is connected to the entrance-side transparent electrode 34 and the exit-side transparent electrode 42 of the transmittance changing unit 16 in a different path than the connecting member 581. For example, the discharge resistor 586 is provided by using a COG (Chip on Glass) technique on an outer periphery of the transmittance changing unit 16. One end of the discharge resistor 587 is connected between the entrance-side transparent electrode 34, and the liquid crystal drive unit 52 and the power source unit 14, and to one connecting member 581. The other end of the discharge resistor 587 is connected between the exit-side transparent electrode 42, and the liquid crystal drive unit 52 and the power source unit 14, and to the other connecting member 581. One example of the resistance value of the discharge resistor 586 is 2 MΩ when the capacitance of the liquid crystal member 38 is 0.1 μF.

Thereby, even if disconnection occurs between the liquid crystal drive unit 52, and the entrance-side transparent electrode 34 or the exit-side transparent electrode 42, the discharge resistor 586 is connected to the entrance-side transparent electrode 34 and the exit-side transparent electrode 42. Accordingly, the discharge unit 580 can allow current to flow between the entrance-side transparent electrode 34 and the exit-side transparent electrode 42 via the discharge resistor 586. Thereby, the discharge unit 580 can move electrical charges accumulated in one of the entrance-side transparent electrode 34 and the exit-side transparent electrode 42 to the other of the exit-side transparent electrode 42 and the entrance-side transparent electrode 34 via the discharge resistor 586. Thereby, even if disconnection occurs in a state where a voltage is being applied between the entrance-side transparent electrode 34 and the exit-side transparent electrode 42, it is possible to resolve a state where the voltage is applied. For example, when the resistance value of the discharge resistor 586 and the capacitance of the liquid crystal member 38 are as mentioned above, 90% of electrical charges can be discharged within 200 ms. As a result of this, the discharge unit 580 can suppress continuation of a state where the transmittance of the transmittance changing unit 16 is low.

Also, even if disconnection occurs between the liquid crystal drive unit 52 and the discharge resistor 587, the discharge unit 580 can discharge electrical charges accumulated in the entrance-side transparent electrode 34 and the exit-side transparent electrode 42 via the discharge resistor 587 as long as the discharge resistor 587 is connected to the entrance-side transparent electrode 34 and the exit-side transparent electrode 42. Note that either one of the discharge resistors 586, 587 may be omitted.

The monitoring unit 582 is connected to the entrance-side transparent electrode 34 and the exit-side transparent electrode 42. One example of the monitoring unit 582 is a watchdog timer. Thereby, the monitoring unit 582 monitors a voltage being applied between the entrance-side transparent electrode 34 and the exit-side transparent electrode 42.

If a state where a voltage is being applied lasts for threshold length of time or longer, the monitoring unit 582 outputs a reset signal to the main control unit 54. One example of monitoring time mentioned here is time of one cycle during which a high voltage and a low voltage are applied in a case where duty-drive of the voltage is performed. Upon acquisition of the reset signal, the main control unit 54 stops voltage application to the transmittance changing unit 16. Thereby, the main control unit 54 can reduce continuation of a low transmittance state of the transmittance changing unit 16 as a result of continuation of voltage application due to certain causes.

Shapes, placement, numeric values such as numbers or the like, materials of configuration in each of the aforementioned embodiments may be changed appropriately. Also, each embodiment may be combined with another embodiment.

Although in the aforementioned embodiments, eye glasses are mentioned as an example of the optical device, the optical device may be applied to a helmet or the like.

Although in the aforementioned embodiments, the transmittance changing unit obtained by combining a pair of a polarizing plate and a liquid crystal member is mentioned as an example, a liquid crystal member that contains pigments whose light absorptivity varies according to an applied voltage may be applied. In this case, the polarizing plate may be omitted.

Although the main control unit 54 was explained as applying a voltage at the frequency of 600 Hz, but other frequencies may be used. For example, the frequency of a voltage only has to be shorter than time required for the transmittance of the transmittance changing unit 16 to stabilize. For example, the frequency of a voltage may be 300 Hz or higher, and a high voltage and a low voltage may be applied cyclically at the frequency.

Although in the aforementioned embodiments, the main control unit 54 switches between a high voltage and a low voltage at a cycle that is shorter than time required for the transmittance of the transmittance changing unit 16 to stabilize when changing from a minimum value to a maximum value by switching the voltage, the voltage may be switched between a high voltage and a low voltage at other cycles. For example, the main control unit 54 may switch the voltage at a cycle that is longer than time required for the aforementioned transmittance to stabilize at a maximum value, and is shorter than the sum of time required for the transmittance of the transmittance changing unit 16 to stabilize when changing from a minimum value to a maximum value by switching a voltage and time required for the transmittance of the transmittance changing unit 16 to stabilize when changing from a maximum value to a minimum value by switching the voltage. Thereby, the transmittance of the transmittance changing unit 16 can be suppressed from being a constant value, so even if flicker occurs, changes in the brightness or darkness are averaged, and flicker can be mitigated. Furthermore, for example, the main control unit 54 may switch the voltage at a cycle that is shorter than time required for the transmittance of the transmittance changing unit 16 to stabilize when changing from a maximum value to a minimum value by switching the voltage. Thereby, the transmittance of the transmittance changing unit 16 can be almost suppressed from being a constant value, so even if flicker occurs, changes in the brightness or darkness are averaged, and flicker can be mitigated. In other words, as indicated with Duty2 to Duty15 in FIG. 20, the main control unit 54 preferably switches the voltage such that the transmittance of the transmittance changing unit 16 does not stabilize, that is, the transmittance is changing at any time.

The main control unit 54 may switch the voltage at a cycle that corresponds to the frequency of external light. For example, when the frequency of a commercial power source is 50 Hz, and the frequency of external light such as an LED is 100 Hz, the voltage is switched at the cycle of (100×(n+0.5)) Hz, where n is a positive integer. Thereby, when the frequency of external light is 100 Hz, the frequency of flicker becomes 50 Hz which is the maximum value, and it is possible to suppress a user from visually recognizing flicker. When the frequency of a commercial power source is 60 Hz and the frequency of external light such as an LED is 120 Hz, the voltage is preferably switched at the cycle of (120×(n+0.5)) Hz, where n is a positive integer. Thereby, when the frequency of external light is 120 Hz, the frequency of flicker becomes 60 Hz which is the maximum value, and it is possible to suppress a user from visually recognizing flicker. Furthermore, the main control unit 54 may switch the voltage at a cycle of (600×(n−1)+550) Hz or (600×(n−1)+650) Hz, where n is a positive integer. By switching the voltage at this cycle, the frequency of flicker becomes 50 Hz even if the frequency of external light is either of 100 Hz and 120 Hz, so it is possible to suppress a user from visually recognizing flicker.

The aforementioned embodiments showed an example in which control is performed such that a difference obtained by subtracting the frontal transmittance at which the light amount is equal to or higher than the light amount threshold from the frontal transmittance at which the light amount becomes lower than the light amount threshold becomes equal to or smaller than a difference obtained by subtracting the peripheral transmittance at which the light amount becomes equal to or higher than the light amount threshold from the peripheral transmittance at which the light amount becomes lower than the light amount threshold However, control may be performed such that a difference obtained by subtracting the frontal transmittance at which the light amount is equal to or higher than the light amount threshold from the frontal transmittance at which the light amount is lower than the light amount threshold becomes equal to or larger than a difference obtained by subtracting the peripheral transmittance at which the light amount is equal to or higher than the light amount threshold from the peripheral transmittance at which the light amount is lower than the light amount threshold.

Although in the aforementioned embodiments, the peripheral transmittance is transmittance for light entering the transmittance changing unit from a direction inclined upward relative to the entrance direction of light to which the frontal transmittance applies, the peripheral transmittance may be transmittance for light entering the transmittance changing unit 16 or the like from a direction inclined downward relative to the entrance direction of light to which the frontal transmittance applies. In this case, the rubbing directions of the entrance-side orientation film 36 and the exit-side orientation film 40 are the directions of the transmittance changing unit 16a shown in FIG. 7.

Although in the aforementioned optical device 110, the entrance-side transparent electrode is divided as an example, the exit-side transparent electrode may be divided. Furthermore, both the entrance-side transparent electrode and the exit-side transparent electrode may be divided into the same shape.

Although in the aforementioned embodiments, the main control unit 54 controls the transmittance of the transmittance changing unit 16 automatically based on a light amount or the like, a user may be allowed to change the transmittance manually by providing a switch, a dial, or the like.

Although in the aforementioned embodiment of FIG. 44 and FIG. 45, the polarization direction of polarized light is rotated by the λ/2 phase plate, the polarization direction may be rotated by a polarization rotator in which liquid crystal polymers or a plurality of phase difference films are laminated by setting their slow axes at preset angles.

Although in the aforementioned embodiments, the proximity sensor 18 judges that a user is present if light reflected on an object is received, whether or not an object on which light is reflected is a user may be judged based on the intensity of light.

Although in the aforementioned embodiments, a secondary battery was applied as the power source unit 14, a solar cell may be applied. Furthermore, because a voltage output by a solar cell changes depending of an amount of light being received, the solar cell may be applied as the power source unit 14 or the light-amount detection unit. Also, a solar cell and a secondary battery that charges electrical power generated by the solar cell may be used in combination as the power source unit 14.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: optical device, 12: frame body, 14: power source unit, 16: transmittance changing unit, 18: proximity sensor, 20: frontal light-amount detection unit, 22: control unit, 24: arm part, 26: frame main body part, 30: entrance-side polarizing plate, 32: entrance-side substrate, 34: entrance-side transparent electrode, 36: entrance-side orientation film, 38: liquid crystal member, 40: exit-side orientation film, 42: exit-side transparent electrode, 44: exit-side substrate, 46: exit-side polarizing plate, 50: charging unit, 52: liquid crystal drive unit, 54: main control unit, 56: storage unit, 66: voltage table, 80: target transmittance table, 110: optical device, 116: transmittance changing unit, 134: entrance-side transparent electrode, 160: divided electrode, 162: divided electrode, 164: divided electrode, 166: voltage table, 210: optical device, 220: upper light-amount detection unit, 270: frontal light-amount detection unit, 272: divided transmission area, 274: frontal light-amount detection unit, 276: frontal transmission portion, 278: low transmission portion, 316: transmittance changing unit, 378: λ/2 phase plate, 416: transmittance changing unit, 430: entrance-side polarizing plate, 478: λ/2 phase plate, 510: optical device, 580: discharge unit, 581: connecting member, 582: monitoring unit, 584: rectifying member, 586: discharge resistor, 587: discharge resistor

What is claimed is:

1. An optical device provided to an eye glass or a helmet, the optical device comprising:
a transmittance changing unit that is provided in front of an eye of a user, and changes transmittance for light from the outside according to a voltage being applied; and
a voltage control unit that controls a voltage to be applied to the transmittance changing unit by switching cyclically between a high voltage and a low voltage, wherein
the voltage control unit switches the voltage at a cycle that is shorter than the sum of time required for transmittance of the transmittance changing unit to stabilize when changing from a minimum value to a maximum value by switching a voltage and time required for transmittance of the transmittance changing unit to stabilize when changing from a maximum value to a minimum value by switching a voltage.

2. The optical device according to claim 1, wherein the voltage control unit switches the voltage at a cycle that is shorter than time required for transmittance of the transmittance changing unit to stabilize when changing from a minimum value to a maximum value by switching a voltage.

3. The optical device according to claim 1, wherein the voltage control unit switches the voltage at a cycle that is shorter than time required for transmittance of the transmittance changing unit to stabilize when changing from a maximum value to a minimum value by switching a voltage.

4. The optical device according to claim 1, wherein the voltage control unit switches the voltage such that transmittance of the transmittance changing unit does not stabilize.

5. The optical device according to claim 1, wherein the voltage control unit controls transmittance of the transmittance changing unit by controlling the voltage by switching a duty ratio of the high voltage.

6. The optical device according to claim 5, wherein the voltage control unit controls the voltage by means of a plurality of duty ratios of the high voltage.

7. The optical device according to claim 6, wherein the voltage control unit controls the plurality of duty ratios at the same high voltage and the same low voltage.

8. The optical device according to claim 1, wherein the transmittance changing unit has:
an entrance-side polarizing plate;
a polarization modulation unit that is provided on a user side of the entrance-side polarizing plate, and modulates, by means of the voltage to be applied by the voltage control unit, a polarization state of polarized light to be output; and
an exit-side polarizing plate that is provided on a user side of the polarization modulation unit.

9. The optical device according to claim 8, wherein the polarization modulation unit includes:
a pair of transparent electrodes that are provided to face each other; and
a liquid crystal member that is provided between the pair of transparent electrodes,
at least one of the pair of transparent electrodes includes a plurality of divided electrodes that extend over the entire length of the liquid crystal member in the horizontal direction and are divided, along the vertical direction, and
the voltage control unit controls duty ratios of voltages to be applied to the plurality of divided electrodes separately.

10. The optical device according to claim 1, further comprising:
a power source unit that is controlled by the voltage control unit to apply a voltage to the transmittance changing unit;
a pair of connecting members that connect the power source unit and the transmittance changing unit; and
a discharge unit that discharges electrical charges accumulated in the transmittance changing unit while the voltage is not applied to a middle portion of the pair of connecting members.

11. The optical device according to claim 10, wherein the discharge unit has two sets of a pair of rectifying members that are connected in series so that rectification directions become the same direction, and
portions of the two sets between the pair of rectifying members are respectively connected to middle portions of the pair of connecting members.

12. The optical device according to claim 10, wherein the discharge unit has a discharge resistor that is connected with the transmittance changing unit in a different path than the pair of connecting members.

13. The optical device according to claim 10, wherein the discharge unit has a discharge resistor that connects one connecting member and another connecting member.

14. The optical device according to claim 9, further comprising a discharge unit has a discharge resistor having both ends that are connected directly with respective ones of the pair of transparent electrodes, and discharges electrical charges accumulated in the transmittance changing unit while the voltage is not applied to the pair of connecting members.

15. The optical device according to claim 1, further comprising a monitoring unit that monitors a voltage applied to the transmittance changing unit, and outputs a reset signal to the voltage control unit when a state where the voltage is being applied lasts for threshold length of time or longer, wherein
    the voltage control unit stops voltage application to the transmittance changing unit upon acquiring the reset signal.

16. The optical device according to claim 1, wherein the voltage control unit controls the voltage at a frequency of $100 \times (n+0.5)$ Hz, where n is a positive integer.

17. The optical device according to claim 1, wherein the voltage control unit controls the voltage at a frequency of $120 \times (n+0.5)$ Hz, where n is a positive integer.

18. The optical device according to claim 1, wherein the voltage control unit controls the voltage at a frequency of $(600 \times (n-1)+550)$ Hz or $(600 \times (n-1)+650)$ Hz, where n is a positive integer.

\* \* \* \* \*